US012694893B2

(12) United States Patent
Feng

(10) Patent No.: US 12,694,893 B2
(45) Date of Patent: Jul. 28, 2026

(54) AUDIO DATA PROCESSING

(71) Applicant: Tencent Technology (Shenzhen) Company Limited, Shenzhen (CN)

(72) Inventor: Xin Feng, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 213 days.

(21) Appl. No.: 18/434,773

(22) Filed: Feb. 6, 2024

(65) Prior Publication Data

US 2024/0212706 A1 Jun. 27, 2024

Related U.S. Application Data

(63) Continuation of application No. PCT/CN2023/097205, filed on May 30, 2023.

(30) Foreign Application Priority Data

Jun. 29, 2022 (CN) .......................... 202210747175.3

(51) Int. Cl.
*G10L 25/78* (2013.01)
*G10L 15/04* (2013.01)
(Continued)

(52) U.S. Cl.
CPC .............. *G10L 25/78* (2013.01); *G10L 15/04* (2013.01); *G10L 25/03* (2013.01); *G11B 27/34* (2013.01)

(58) Field of Classification Search
CPC ......... G10L 25/78; G10L 15/04; G10L 25/03; G11B 27/34
See application file for complete search history.

(56) References Cited

U.S. PATENT DOCUMENTS

| | | | | |
|---|---|---|---|---|
| 11,354,905 | B1* | 6/2022 | Chen | G06V 20/49 |
| 12,230,052 | B1* | 2/2025 | Kviatkovsky | G06V 10/82 |

(Continued)

FOREIGN PATENT DOCUMENTS

| | | | | |
|---|---|---|---|---|
| CN | 112185360 A | * | 1/2021 | G10L 15/16 |
| CN | 113949931 A | * | 1/2022 | H04N 21/4668 |
| CN | 114822512 A | | 7/2022 | |

OTHER PUBLICATIONS

Dai, Yimian, et al. "Attentional feature fusion." Proceedings of the IEEE/CVF winter conference on applications of computer vision. 2021 (Year: 2021).*

(Continued)

*Primary Examiner* — Bhavesh M Mehta
*Assistant Examiner* — Joseph J. Yamamoto
(74) *Attorney, Agent, or Firm* — ArentFox Schiff LLP

(57) ABSTRACT

A method of media processing includes extracting audio track data for at least a signal source type from audio data. The audio data includes multiple data segments, the audio track data includes at least a time period that is determined to be related to the signal source type. The method further includes allocating weight values respectively to the data segments in the audio data according to the audio track data, concatenating the weight values to form a weight value sequence of the audio data, extracting audio features respectively from the data segments, concatenating the audio features of the data segments to form an audio feature sequence of the audio data, encoding the audio feature sequence to obtain an attention parameter sequence of the audio data, fusing the attention parameter sequence and the weight value sequence to obtain fusion parameters respectively for the data segments, and determining recommendation parameters accordingly.

19 Claims, 10 Drawing Sheets

(51) Int. Cl.
  *G10L 25/03*    (2013.01)
  *G11B 27/34*    (2006.01)

(56)       References Cited

U.S. PATENT DOCUMENTS

| | | | | |
|---|---|---|---|---|
| 2022/0245424 A1* | 8/2022 | Goyal | .................... | G06N 3/049 |
| 2022/0261217 A1* | 8/2022 | Wu | ......................... | G06F 3/162 |
| 2023/0316370 A1* | 10/2023 | Kini | ..................... | G06F 3/0482 |
| | | | | 705/26.7 |

OTHER PUBLICATIONS

International Search Report and Written Opinion received for PCT Patent Application No. PCT/CN2023/097205, mailed on Aug. 23, 2023, 16 pages (6 pages of English Translation and 10 pages of Original Document).

* cited by examiner

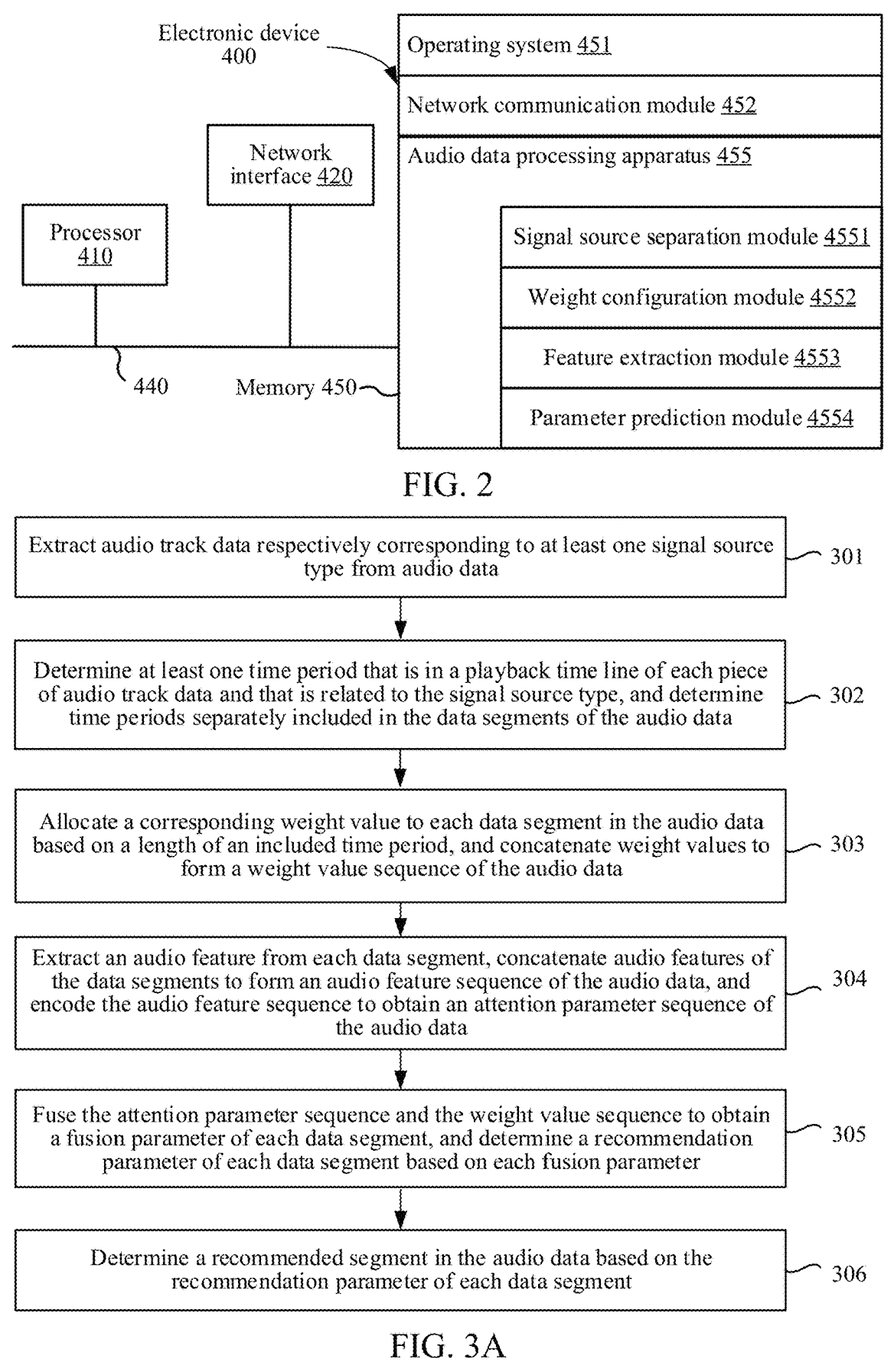

Electronic device 400

Operating system 451

Network communication module 452

Network interface 420

Audio data processing apparatus 455

Processor 410

Signal source separation module 4551

Weight configuration module 4552

Feature extraction module 4553

Memory 450

Parameter prediction module 4554

Extract audio track data respectively corresponding to at least one signal source type from audio data — 301

Determine at least one time period that is in a playback time line of each piece of audio track data and that is related to the signal source type, and determine time periods separately included in the data segments of the audio data — 302

Allocate a corresponding weight value to each data segment in the audio data based on a length of an included time period, and concatenate weight values to form a weight value sequence of the audio data — 303

Extract an audio feature from each data segment, concatenate audio features of the data segments to form an audio feature sequence of the audio data, and encode the audio feature sequence to obtain an attention parameter sequence of the audio data — 304

Fuse the attention parameter sequence and the weight value sequence to obtain a fusion parameter of each data segment, and determine a recommendation parameter of each data segment based on each fusion parameter — 305

Determine a recommended segment in the audio data based on the recommendation parameter of each data segment — 306

FIG. 3A

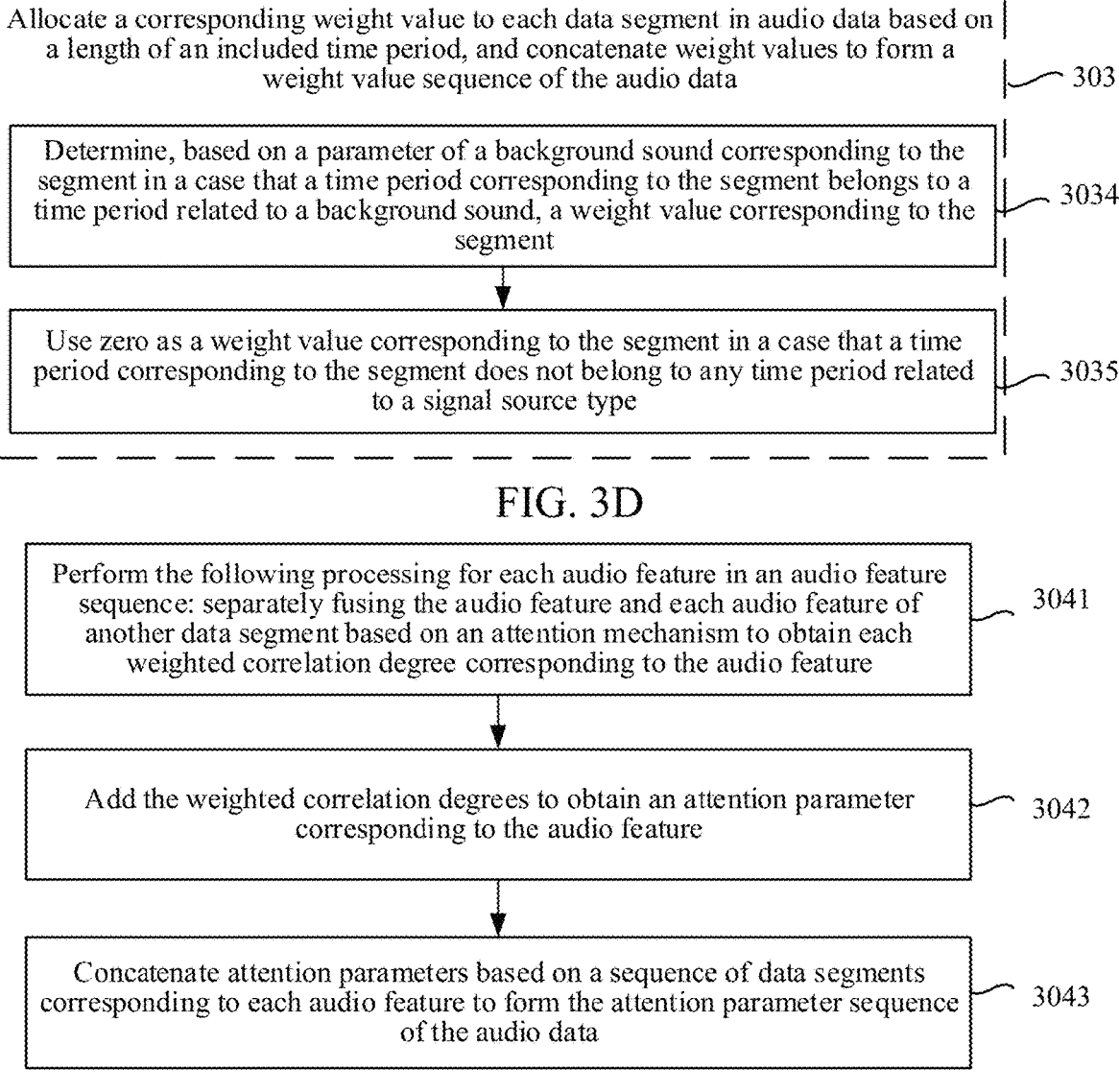

Allocate a corresponding weight value to each data segment in audio data based on a length of an included time period, and concatenate weight values to form a weight value sequence of the audio data ⌐ 303

Determine, based on a parameter of a background sound corresponding to the segment in a case that a time period corresponding to the segment belongs to a time period related to a background sound, a weight value corresponding to the segment ⌐ 3034

Use zero as a weight value corresponding to the segment in a case that a time period corresponding to the segment does not belong to any time period related to a signal source type ⌐ 3035

FIG. 3D

Perform the following processing for each audio feature in an audio feature sequence: separately fusing the audio feature and each audio feature of another data segment based on an attention mechanism to obtain each weighted correlation degree corresponding to the audio feature ⌐ 3041

Add the weighted correlation degrees to obtain an attention parameter corresponding to the audio feature ⌐ 3042

Concatenate attention parameters based on a sequence of data segments corresponding to each audio feature to form the attention parameter sequence of the audio data ⌐ 3043

FIG. 3E

Video picture frame

Audio feature map

Audio track data

Recommendation parameter curve

Audio track waveform

Audio track feature map

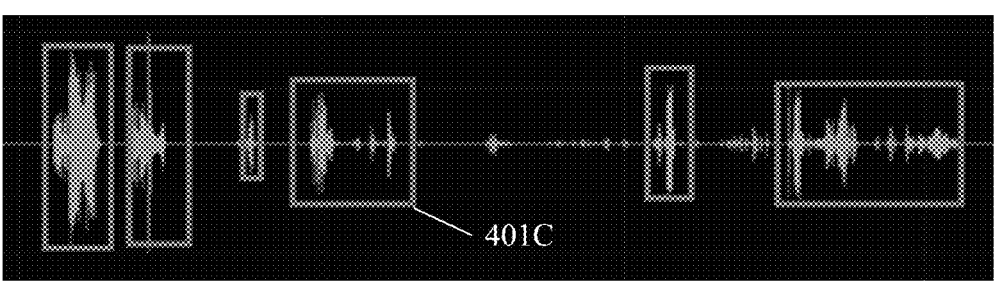

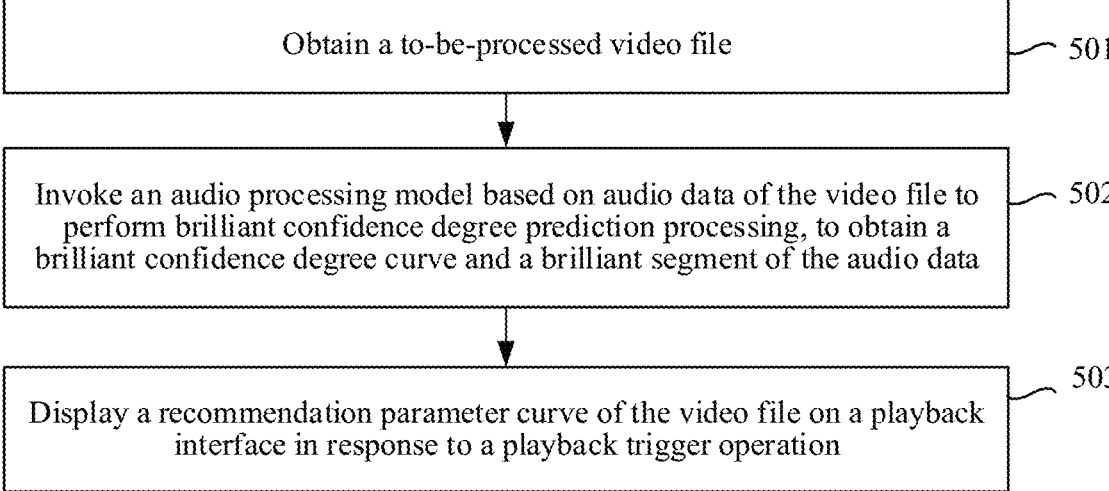

| Obtain a to-be-processed video file | 501 |
|---|---|

| Invoke an audio processing model based on audio data of the video file to perform brilliant confidence degree prediction processing, to obtain a brilliant confidence degree curve and a brilliant segment of the audio data | 502 |

| Display a recommendation parameter curve of the video file on a playback interface in response to a playback trigger operation | 503 |

FIG. 5

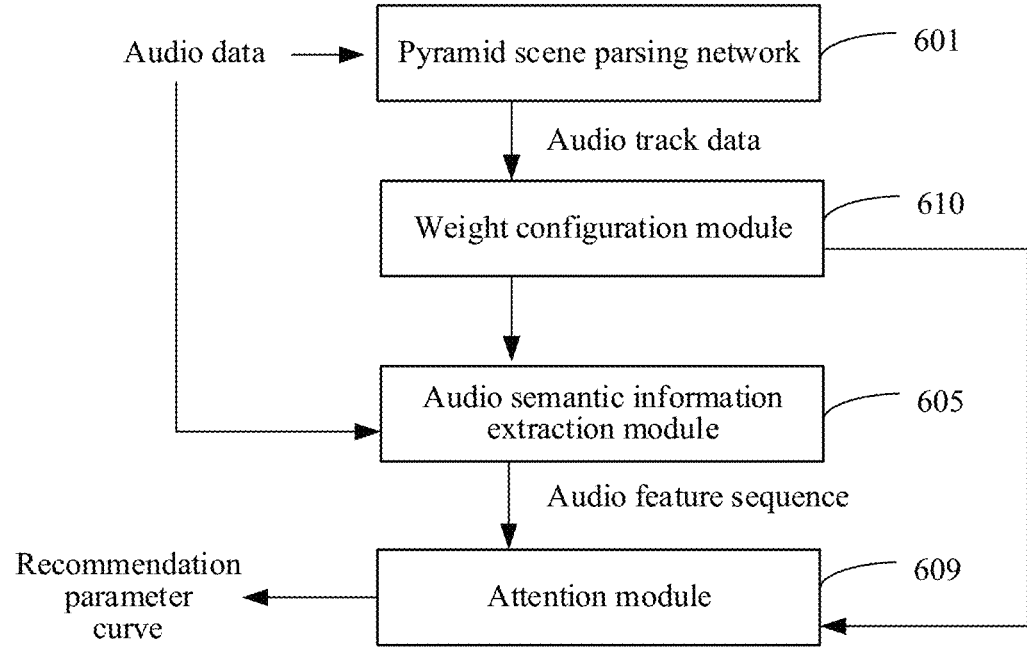

Audio data → Pyramid scene parsing network — 601

Audio track data

Weight configuration module — 610

Audio semantic information extraction module — 605

Audio feature sequence

Recommendation parameter curve ← Attention module — 609

FIG. 6A

Playback interface 101A

Brilliant segment 107A

Brilliant degree curve 106A

Label 104A     Slider 103A     Progress bar 105A

Playback time line

Audio data 1101

AUDIO DATA PROCESSING

RELATED APPLICATIONS

The present application is a continuation of International Application No. PCT/CN2023/097205, filed on May 30, 2023, which claims priority to Chinese Patent Application No. 202210747175.3, filed on Jun. 29, 2022. The entire disclosures of the prior applications are hereby incorporated by reference.

FIELD OF THE TECHNOLOGY

This application relates to computer technologies, including an audio data processing method and apparatus.

BACKGROUND OF THE DISCLOSURE

An online multimedia (for example, video or audio) playback platform needs to mark some special data segments in multimedia data, which is referred to as a recommended segment, for example, a brilliant data segment, a popular data segment, and the like, to facilitate user viewing.

A related art determines a recommended video/audio data segment by using video/audio playback record data. However, for a newly released video/audio, no playback record data exists, and a recommended segment can be manually annotated only. For example, through manual annotation, a brilliant data segment of an entire episode video is located. However, manual annotation relies heavily on subjective feelings during manual annotation. Annotated recommended segments are different according to different annotation people. In addition, manual annotation takes too long, annotation efficiency is low, and fast batch production cannot be performed.

In conclusion, for multimedia data that has no large quantity of playback record data, there is no good manner of identifying a recommended data segment at present.

SUMMARY

Aspects of this disclosure provide a media (e.g., audio in media) data processing method and apparatus, an electronic device, a computer program product, a computer readable storage medium, and a computer program product, so that a recommended segment can be accurately identified from audio data.

In some examples, a method of media processing includes extracting audio track data of at least a signal source type from audio data. The audio data includes multiple data segments, the audio track data includes at least a time period that is determined to be related to the signal source type. The method further includes allocating weight values respectively to the data segments in the audio data according to the audio track data, concatenating the weight values to form a weight value sequence of the audio data, extracting audio features respectively from the data segments, concatenating the audio features of the data segments to form an audio feature sequence of the audio data, encoding the audio feature sequence to obtain an attention parameter sequence of the audio data, fusing the attention parameter sequence and the weight value sequence to obtain respective fusion parameters for the data segments, determining recommendation parameters of the data segments based on the fusion parameters, and determining a recommended segment in the audio data based on the recommendation parameters of the data segments.

Apparatus and non-transitory computer-readable storage medium counterpart aspects are also contemplated.

The aspects of this disclosure have the following beneficial effects: on one hand, audio track data corresponding to at least one signal source is extracted from audio data, and a corresponding weight value is allocated to a data segment based on a time period related to a signal source. Therefore, when a weight value sequence formed by weight values of data segments is fused with an attention parameter sequence, importance of the data segment corresponding to the signal source can be highlighted in time domain. On the other hand, the attention parameter sequence is used for highlighting, from a frequency domain level, a feature of a data segment that is in an audio feature and that is related to the signal source. In this way, information about the audio track of the audio data in terms of time domain and frequency domain is quantized, and a probability (a recommendation parameter) that each data segment in the audio data belongs to a data segment of a specific type is predicted. Compared with prediction only from a frequency domain level, identification is more comprehensive, so that a valuable recommended segment can be accurately identified based on a recommendation parameter of each data segment, and accurate reference information is provided for a user.

BRIEF DESCRIPTION OF THE DRAWINGS

FIG. 2 is a schematic structural diagram of an electronic device according to an aspect of this disclosure.

FIG. 3A is a first schematic flowchart of an audio data processing method according to an aspect of this disclosure.

FIG. 3D is a fourth schematic flowchart of an audio data processing method according to an aspect of this disclosure.

FIG. 3E is a fifth schematic flowchart of an audio data processing method according to an aspect of this disclosure.

FIG. 4C is a schematic diagram of a time period according to an aspect of this disclosure.

FIG. 5 is a schematic flowchart of an audio data processing method according to an aspect of this disclosure.

FIG. 6A is a first schematic diagram of an audio processing model according to an aspect of this disclosure.

DETAILED DESCRIPTION

Figure 1:
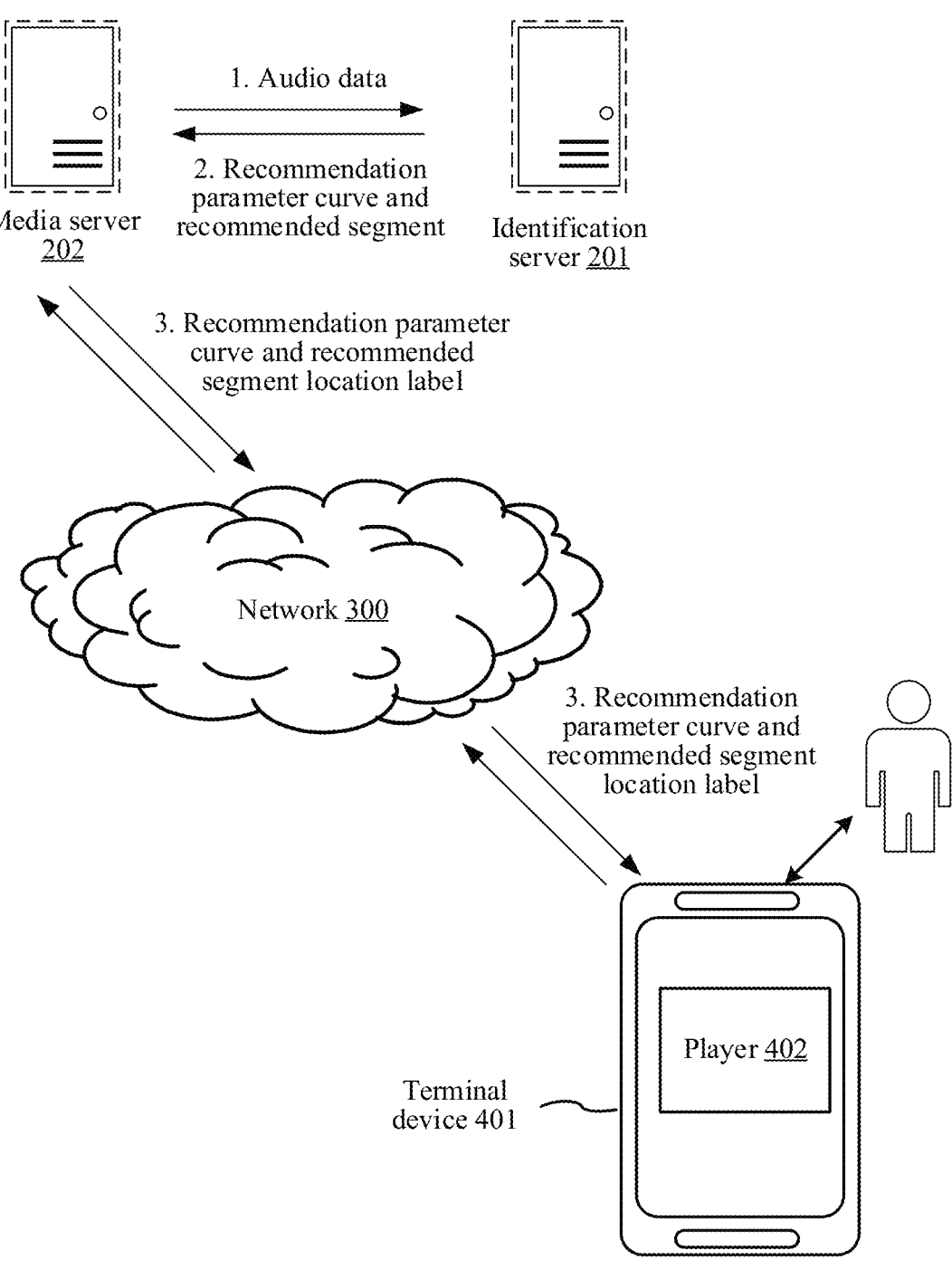
FIG. 1 is a schematic diagram of an application mode of an audio data processing method according to an aspect of this disclosure.

To make the objectives, technical solutions, and advantages of this disclosure clearer, the following describes this disclosure in further detail with reference to the accompanying drawings. The described aspects are not to be considered as a limitation to this disclosure. All other aspects obtained by a person of ordinary skill in the art without creative efforts shall fall within the protection scope of this disclosure.

In the following description, the term "some aspects" describes subsets of all possible aspects, but it may be understood that "some aspects" may be the same subset or different subsets of all the possible aspects, and can be concatenated with each other without conflict.

In the following description, the term "first\second\third" is merely used for distinguishing between similar objects, and does not represent a specific sorting for the objects. It may be understood that a specific sequence or an order of "first\second\third" may be interchanged when allowed, so that the aspects of this disclosure described herein can be implemented in a sequence other than that shown or described herein.

In aspects of this disclosure, related data (for example, multimedia data, voice, and audio track data) such as user information and user feedback data is involved. When the aspects of this disclosure are applied to a specific product or technology, user permission or consent needs to be obtained, and collection, use, and processing of related data need to comply with related laws, regulations, and standards of a related country or region.

Terms used in this specification are merely intended to describe exemplary aspects of this disclosure, and are not intended to limit this disclosure.

Before the aspects of this disclosure are further described in detail, a description is made on terms in the aspects of this disclosure, and the terms in the aspects of this disclosure are applicable to the following explanations.

(1) A pyramid scene parsing network (PSPN) is used for predicting a label, a location, and a shape of an object to which attention is paid. The network includes a pyramid pooling module, and the pyramid pooling module may aggregate local context information to form global context information, to more comprehensively implement processing such as locating and classification.

(2) Signal source separation: In audio data (for example, audio data extracted from an audio track of video data or audio data extracted from an audio file), one or more audio signals may be carried (that is, short for a digital audio signal, where the digital audio signal is obtained by sampling and encoding an analog audio signal). A signal source is a source of generating a sound signal, a signal source type is a type of a sound generating source, each audio signal corresponds to one signal source type (for example, a corresponding signal source type of sound is human), and signal source separation is to perform separation processing to extract, through signal processing or another algorithm, a sequence of audio signals of a specified signal source, and finally generate audio track data formed by a sequence of audio signals of different signal source types, for example, voice track data and background track data.

(3) A voice activity detection (VAD) algorithm is an algorithm used for detecting voice/non-voice (non-voice/mute) in audio. It is widely used in scenarios such as speech coding, noise reduction, and automatic speech recognition (ASR).

(4) Time domain and frequency domain: Time domain and frequency domain are basic properties of audio data, are used for analyzing different angles of audio data, and are two dimensional concepts for measuring an audio feature. In the time domain dimension, a sampling point of audio data is presented in terms of time, and a correspondence exists between a signal and time. A signal may be transformed from time domain to frequency domain through Fourier transform. The frequency domain is used for analyzing energy distribution of audio data on each frequency band, and includes a feature representation of audio data to a certain extent.

(5) Mel frequency is a non-linear frequency scale determined based on sensory determining of an equidistant pitch change by human ears, is an artificially set frequency scale that can more cater to a change of an auditory perception threshold of the human ears when signal processing is performed. In an audio processing field, many basic audio features are calculated by using the mel frequency.

(6) A convolutional neural network (CNN) is a type of feed forward neural network (FNN) that includes convolutional computation and has a deep structure, and is one of representative algorithms of deep learning. A convolutional neural network has a representation learning capability, and can perform shift-invariant classification on an input image according to a hierarchical structure of the convolutional neural network. An artificial neuron of the convolutional neural network may respond to peripheral units within a portion of coverage. The convolutional neural network includes one or more convolutional layers and a fully connected layer at the top (corresponding to a classical neural network), and also includes a correlation weight and a pooling layer.

(7) An attention mechanism is a solution to a problem proposed by mimicking human attention, and can quickly select high-value information from a large amount of information. The attention mechanism is mainly used for resolving a problem that it is difficult to obtain a final reasonable vector representation when a model input sequence of a long short-term memory (LSTM) and a recurrent neural network (RNN) is relatively long. The method is to retain an intermediate result of the long short-term memory network, and learn a correlation between the intermediate result and an output result by using a new model, thereby determining information with relatively high brilliant degree in the output result, to achieve a purpose of information filtering.

(8) A time period is an interval on a playback time line of multimedia data. For example, in a video whose duration is 10 minutes, an interval from the fifth minute to the eighth minute on the playback time line may be referred to as one time period.

(9) A data segment is data of a corresponding time period in multimedia data. For example, for a video whose duration is 10 minutes, data corresponding to a time period from the fifth minute to the eighth minute on a playback time line may be referred to as one data segment, which may be distinguished as a data segment of an audio track and a data segment of a video track. One video may be divided into multiple data segments with equal duration.

(10) A recommended segment is a data segment that is in multimedia data and that includes to-be-expressed key information or extreme emotion (for example, sadness and pleasure), and is corresponding to one time data segment on a playback time line in playback time. The multimedia data may be a video, a song, an audio novel, a radio play, or the like, and the recommended segment may be the following types: a brilliant segment including a key plot in a movie, a sad segment of a song expressing a sad emotion, and the like.

(11) A recommendation parameter quantizes a probability representing that a data segment belongs to a recommended segment of a specific type. For example, the recommendation parameter represents a probability representing that a recommended segment is a brilliant segment in multimedia data.

Aspects of this disclosure provide an audio data processing method, an audio data processing apparatus, an electronic device, a computer program product, and a computer readable storage medium, so that a recommended segment in audio data can be accurately obtained.

FIG. 1 is a schematic diagram of an application mode of an audio data processing method according to an aspect of this disclosure. For example, an involved server includes: an identification server 201 and a media server 202, where the media server 202 may be a server of a video platform, a server of a music platform, an audio novel, a server of a radio play platform, or the like. FIG. 1 further shows a network 300 and a terminal device 401. The identification server 201 communicates with the media server 202 by using the network 300, or communicates in another manner. The terminal device 401 connects to the media server 202 by using the network 300. The network 300 may be a wide area network or a local area network, or a concatenation thereof.

In some aspects, the media server 202 sends audio data (for example, an audio novel or online music) to the identification server 201, the identification server 201 determines a recommendation parameter (for example, a probability that a data segment belongs to a brilliant segment, a sad segment, a funny data segment, and the recommendation parameter is positively correlated with a brilliant degree, a sad degree, a funny degree, and the like) of each data segment in the audio data, and generates a recommendation parameter curve based on the recommendation parameter, and determines a recommended segment in the audio data. The recommendation parameter curve and the recommended segment are sent to the media server 202. The media server 202 sends the recommendation parameter curve and a recommended segment location label to the terminal device 401. The terminal device 401 runs a player 402, and when the player 402 plays corresponding audio data, the recommendation parameter curve and the recommended segment location label are displayed. A user can conveniently determine a recommendation parameter of each data segment in the audio data based on the recommendation parameter curve, and can jump to a corresponding location based on the recommended segment location label to play, to locate the recommended segment.

In some aspects, audio data is segmented from an audio track of video data (such as an online or local video), to obtain audio data. The audio data is aligned with a time line of a video picture, and brilliant data segments of the audio data are in a one-to-one correspondence with brilliant data segments of the video data. The recommended segment may be a brilliant data segment, a sad data segment, a funny data segment, or the like. The following uses an example in which the recommendation parameter is a probability that a data segment belongs to a brilliant segment, and the recommended segment is a brilliant data segment. The user may be an audience watching a video, or a user who uses video data as a material for secondary creation. By using the recommendation parameter curve and the location label of the brilliant data segment, the user can quickly determine the brilliant data segment in the video, and then view the brilliant data segment, or cut the brilliant data segment from the video data for secondary creation.

In some aspects, the identification server 201 and the media server 202 may be integrated together to implement a unified server, or may be separately disposed.

This aspect of this disclosure may be implemented by using a blockchain technology, a recommendation parameter curve obtained by using the audio data processing method in this aspect of this disclosure is a detection result, and the detection result is uploaded to a blockchain for storage, to ensure reliability of the detection result by using a consensus algorithm. A blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include a blockchain underlying platform, a platform product service layer, and an application service layer.

This aspect of this disclosure may be implemented by using a database technology. In short, a database can be considered as an electronic file cabinet—a place for storing electronic files. A user can perform operations such as adding, querying, updating, and deleting on data in the file. The so-called "database" is a data set that is stored together in a specific manner, can be shared with multiple users, has as little redundancy as possible, and is independent of an application program.

A database management system (DBMS) is a computer software system designed to manage a database, and generally has basic functions such as storage, interception, security guarantee, and backup. The database management system may be classified according to a database model supported by the database management system, for example, relational and extensible markup language (XML); or may be classified according to a supported computer type, for example, a server cluster and a mobile phone; or may be classified according to a query language used, such as structured query language (SQL) and Xquery; or may be classified according to a performance impulse focus, for example, a maximum size and a maximum running speed; or may be classified according to another classification manner. Regardless of the classification type used, some DBMSs can span categories, such as supporting multiple query languages at the same time.

In some aspects, the server may be an independent physical server, or may be a server cluster or a distributed system formed by multiple physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal device may be a smartphone, a tablet computer, a notebook computer, a desktop computer, a smart speaker, a smart watch, a smart TV, an in-vehicle terminal, or the like, but is not limited thereto. The terminal device and the server may be directly or indirectly connected in a wired or wireless communication manner, which is not limited in the aspects of this disclosure.

This aspect of this disclosure may further be implemented by using a cloud technology. The cloud technology is a general term of a network technology, an information technology, an integration technology, a management platform technology, and an application technology that are applied based on a cloud computing business model. The cloud technology may form a resource pool and be used as required, and is flexible and convenient. The cloud computing technology will become an important support. A background service of a technology network system requires a large amount of computing and storage resources, such as a video website, a picture website, and more portals. With rapid development and application of the Internet industry, and promotion of needs of search services, social networks, mobile commerce, and open collaboration, each item may have its own hash coded identification mark in the future. The identification mark needs to be transmitted to a background system for logical processing. Data at different levels will be processed separately. All types of industry data need to be supported by a powerful system, which can only be implemented through cloud computing.

FIG. 2 is a schematic structural diagram of an electronic device according to an aspect of this disclosure. The electronic device 400 may be the terminal device 401 in FIG. 1, or may be a server (the identification server 201, the media server 202, or a concatenation of the two). The electronic device 400 includes: at least one processor 410, a memory 450, and at least one network interface 420. Components in the electronic device 400 are coupled together by using a bus system 440. It may be understood that, the bus system 440 is configured to implement connection and communication between the components. In addition to a data bus, the bus system 440 further includes a power bus, a control bus, and a state signal bus. However, for clear description, all types of buses in FIG. 2 are marked as the bus system 440.

The processor 410 may be an integrated circuit chip, and has a signal processing capability, for example, a general-purpose processor, a digital signal processor (DSP), another programmable logic device, a discrete gate or transistor logic device, or a discrete hardware component. The general-purpose processor may be a microprocessor or any conventional processor.

The memory 450 may be removable, non-removable, or a concatenation thereof. An exemplary hardware device includes a solid-state memory, a hard disk drive, an optical disk drive, and the like. In some aspects, the memory 450 may include one or more storage devices that are physically away from the processor 410.

The memory 450 includes a volatile memory or a non-volatile memory, or may include both a volatile memory and a non-volatile memory. The non-volatile memory may be a read-only memory (ROM), and the volatile memory may be a random access memory (RAM). The memory 450 described in this aspect of this disclosure is intended to include any suitable type of memory.

In some aspects, the memory 450 can store data to support various operations, and examples of the data include programs, modules, and data structures, or subsets or supersets thereof, as illustrated below.

An operating system 451 includes system programs used for processing various basic system services and executing hardware-related tasks, such as a framework layer, a core library layer, and a driver layer, and is used for implementing various basic services and processing hardware-based tasks.

A network communication module 452 is configured to reach another electronic device by using one or more (wired or wireless) network interfaces 420. An exemplary network interface 420 includes: Bluetooth, wireless compatibility authentication (Wi-Fi), universal serial bus (USB), and the like.

In some aspects, the audio data processing apparatus provided in the aspects of this disclosure may be implemented in a software manner. FIG. 2 shows an audio data processing apparatus 455 stored in the memory 450, which may be software in a form of a program, a plug-in, or the like, and includes the following software modules: a signal source separation module 4551, a weight configuration module 4552, a feature extraction module 4553, and a parameter prediction module 4554, which are logical modules. Therefore, any concatenation or further division may be performed according to an implemented function. Functions of the modules are described below.

In some aspects, the terminal device or the server may implement, by running a computer program, the audio data processing method provided in the aspects of this disclosure. For example, the computer program may be a native program or a software module in an operating system; may be a native application (APP), that is, a program that is executable only after being installed in an operating system, such as a video APP or an audio APP; or may be an applet, that is, a program that is executable by downloading it to a browser environment. In summary, the computer program may be an application, a module, or a plug-in in any form.

FIG. 3A is a first schematic flowchart of an audio data processing method according to an aspect of this disclosure. The method may be performed by an electronic device, and is described with reference to the steps shown in FIG. 3A.

In step 301, audio track data respectively corresponding to at least one signal source type is extracted from audio data.

For example, audio track data files (or audio data packets) respectively corresponding to different signal source types are separated from an audio data file (or an audio data packet).

For example, the audio data includes multiple data segments, the data segments may be consecutive, and playback duration of each data segment may be the same or different. For example, the audio data is divided into multiple data segments with the same playback duration, or the audio data is divided into multiple data segments with different playback duration.

For example, the audio data may be native audio data (for example, an audio novel or a radio play), or may be extracted from video data. A recommendation parameter may include: a brilliant degree, a sad degree, a funny degree, a passionate degree, and the like. Corresponding recommended segments are respectively a brilliant data segment, a sad data segment, a funny data segment, and the like.

In some aspects, step 301 is implemented in the following manner: performing feature extraction on the audio data to obtain a global feature of the audio data; and performing signal source separation on the audio data by using the global feature as a mask to obtain audio track data respectively corresponding to each signal source type in the audio data. Herein, a boundary of the mask is used for representing a boundary between audio data corresponding to different signal source types.

The performing feature extraction on the audio data includes: performing multiple levels of feature extraction for the audio data, and fusing features obtained at the levels into a global feature. Signal source separation may be implemented by using a pyramid scene parsing network (PSPN). The following separately explains feature extraction and signal source separation.

In some aspects, the performing feature extraction on the audio data to obtain a global feature of the audio data is implemented in the following manner: performing feature extraction processing on the audio data to obtain an original feature of the audio data; performing multiple levels of pooling processing on the original feature to obtain multiple local features of the audio data; and concatenating the multiple local features to obtain the global feature of the audio data.

Figure 7:
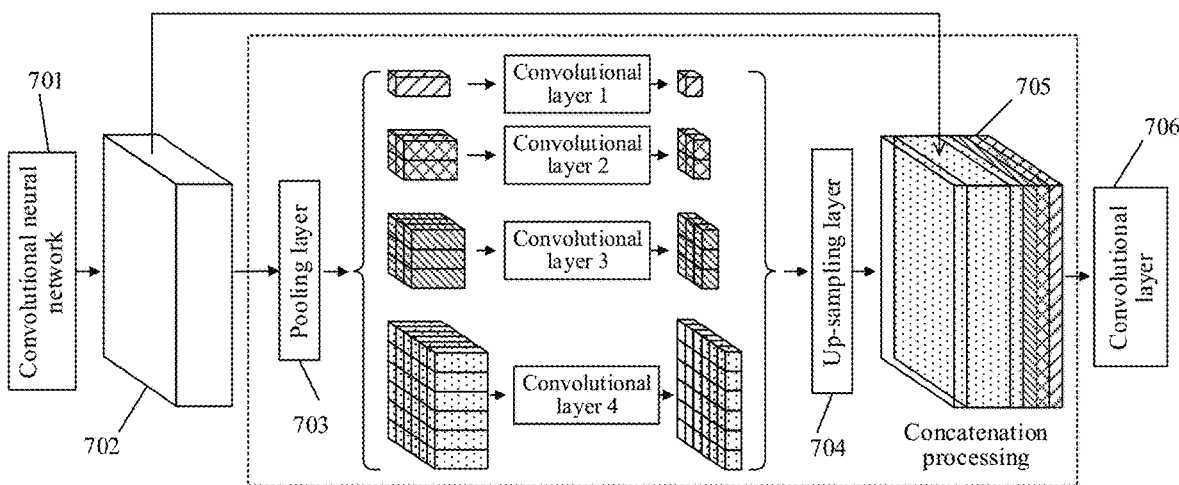
FIG. 7 is a schematic diagram of a pyramid scene parsing network according to an aspect of this disclosure.

For example, pooling processing may be implemented by using a pyramid pooling module of the pyramid scene parsing network (PSPN). FIG. 7 is a schematic diagram of a pyramid scene parsing network according to an aspect of this disclosure. The following specifically describes that the pyramid scene parsing network includes: a convolutional neural network 701, a pooling layer 703, and a pyramid pooling module (the pyramid pooling module in FIG. 7 includes a convolutional layer 1, a convolutional layer 2, a convolutional layer 3, and a convolutional layer 4), an up-sampling layer 704, and a convolutional layer 706.

The convolutional neural network 701 performs feature extraction on the audio data to obtain an original feature 702 of the audio data, and the pyramid pooling module is disposed after the pooling layer 703. In a specific implementation, more sizes may be set according to extraction precision. Assuming that there are N levels in the pyramid, 1×1 convolution is used after each level, and a quantity of channels at a corresponding level is reduced to 1/N of an original quantity. Then, a low-dimensional feature map is directly up-sampled by using bilinear interpolation through the up-sampling layer 704 to obtain a feature map of the same size as an original feature map. Each layer of the pyramid pooling module of the pyramid scene parsing network outputs local features of different sizes, and concatenates feature maps 705 of different levels to obtain a final global feature.

Still referring to FIG. 7, an implementation of performing signal source separation on the audio data by using the global feature as a mask is as follows: using the global feature as a mask to perform convolution, by using the convolutional layer 706, on an initial-level feature extracted from the pyramid scene parsing network, to obtain a feature map corresponding to audio track data corresponding to each signal source type in the audio data.

For example, it is assumed that a feature is represented by using a form of a feature matrix, and a global feature is used as a mask. The mask is a feature matrix that has the same size as an initial-level feature extracted by a pyramid scene parsing network. A part corresponding to the global feature has a mask value of 1, and a mask value of another part is 0. The global feature is used as a mask to perform convolution the initial-level feature extracted by the pyramid scene parsing network, so that boundaries between spectra of audio data of different signal source types can be distinguished, and sub-audio data of different signal source types can be separately separated from entire audio data to obtain audio track data respectively corresponding to each signal source type. The signal source type includes: background sound and voice.

In this aspect of this disclosure, multi-level feature extraction processing is performed on audio data by using a pyramid scene parsing network, so that precision of feature extraction is improved, and accuracy of separating audio data corresponding to different signal source types is improved by convolution based on an extracted global feature and an extraction result of an initial-level feature, improving accuracy of separating audio data corresponding to different signal source types, and further determining a weight value sequence of the audio data according to different sound source types, and obtain information about a sound source type from the audio data, to improve precision of obtaining a recommendation parameter.

In step 302, at least one time period that is in a playback time line of each piece of audio track data and that is related to the signal source type is determined, and time periods separately included in the data segments of the audio data are determined.

For example, the time period is a segment on a time line of the audio data. The at least one time period related to the signal source type refers to a time period in which a signal source corresponding to the signal source type generates a sound, and whether the signal source corresponding to the signal source type generates a sound may be determined by using short time energy of track data corresponding to the signal source type. Each data segment may protect a time period of at least one type of signal source. For example, the data segment includes a time period of voice whose time length is the same as playback duration of the data segment, and a time period of a background sound. Alternatively, the data segment includes a time period of voice whose time length is half of the playback duration.

Figures 3B, 3C:
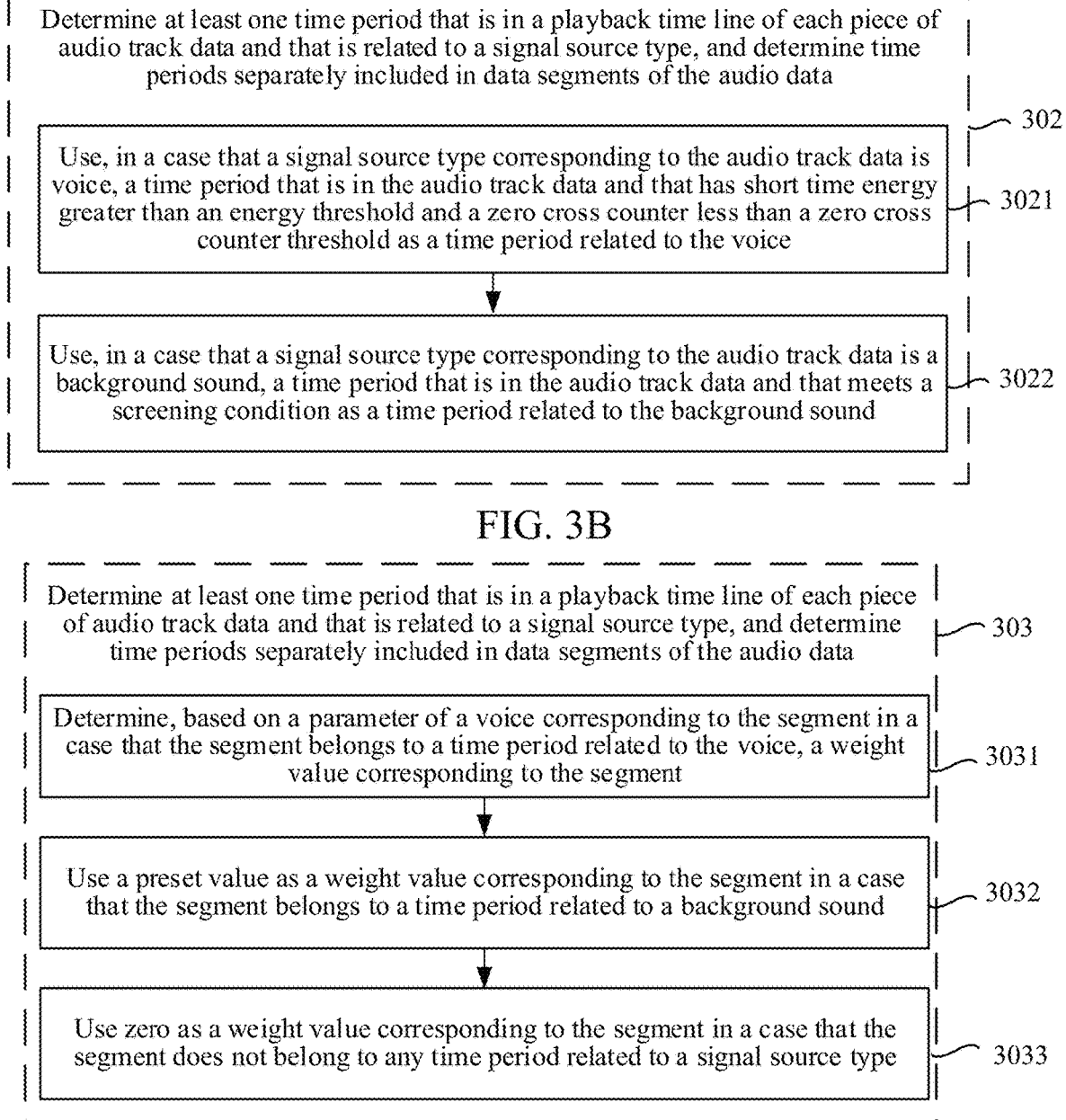
FIG. 3B is a second schematic flowchart of an audio data processing method according to an aspect of this disclosure.
FIG. 3C is a third schematic flowchart of an audio data processing method according to an aspect of this disclosure.

In some aspects, FIG. 3B is a second schematic flowchart of an audio data processing method according to an aspect of this disclosure. Step 302 in FIG. 3A is implemented by using step 3021 and step 3022 in FIG. 3B, and a detailed description is provided in the following. For example, an execution sequence of step 3021 and step 3022 is not limited.

In step 3021, in a case that a signal source type corresponding to the audio track data is voice, a time period that is in the audio track data and that has short time energy greater than an energy threshold and a zero cross counter less than a zero cross counter threshold is used as a time period related to the voice.

For example, the voice-related time period may be obtained by using a voice activity detection (VAD) algorithm. The short time energy, that is, energy of one frame of voice signal, is a sum of squares of intra-frame signals, and the zero cross counter is a quantity of times that one frame of voice time domain signal passes through 0 (0 point of a time line). A principle of the voice activity detection algorithm is that short time energy of a voice data segment is relatively large, and a zero cross counter is relatively small. On the contrary, short time energy of a non-voice data segment is relatively small, but a zero cross counter is relatively large. Most of energy of a voice signal is included in a low frequency band, and energy of a noise signal is usually small and the noise signal contains information of a higher frequency band. Therefore, the two parameters of the voice signal may be measured and compared with thresholds respectively corresponding to the parameters, to distinguish a voice signal from a non-voice signal, that is, determine a part in which a sound is generated from the audio track data and a part in which no sound is generated. When the short time energy of the audio data is less than a short time energy threshold and the zero cross counter is greater than the zero cross counter threshold, the audio segment is noise. On the contrary, when the short time energy of the audio data is greater than the short time energy threshold and the zero cross counter is less than the zero cross counter threshold, the audio segment is voice.

In step 3022, in a case that a signal source type corresponding to the audio track data is a background sound, a time period that is in the audio track data and that meets a screening condition is used as a time period related to the background sound.

The screening condition includes any one of the following:

Condition 1: Loudness corresponding to the time period is greater than a lower loudness limit. For example, if duration is too short or the sound is too small, it may be noise, not background music. The lower loudness limit may be determined by using a preset multiple (greater than 0 and less than 1) of a median value of loudness corresponding to the audio data. For example, a mean value of a sum of a maximum value and a minimum value of the loudness is the median value of the loudness, and 0.5 times of the median value of the loudness is the lower loudness limit. A time period in the audio data and whose loudness is less than the lower limit is determined as a segment that does not meet the screening condition.

Condition 2: A length of the time period is greater than a lower length limit. The lower length limit is determined based on the time length of the audio data. For example, the lower length limit value is 1% of the audio data.

Figure 11:
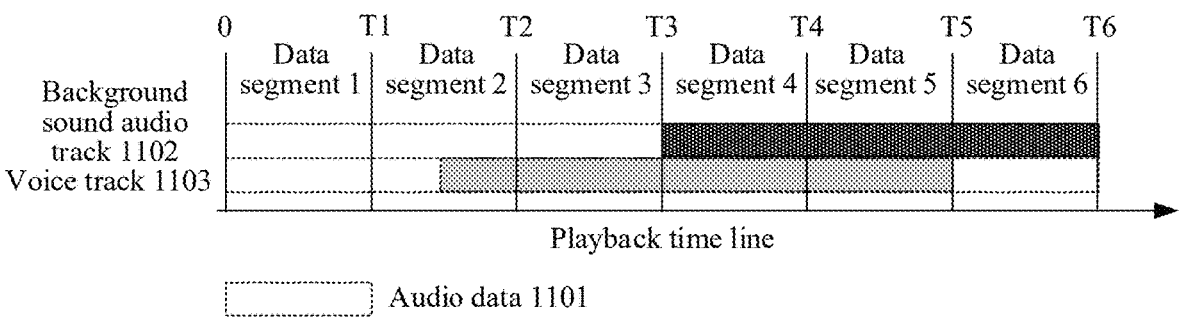
FIG. 11 is a schematic diagram of audio data according to an aspect of this disclosure.

FIG. 11 is a schematic diagram of audio data according to an aspect of this disclosure. A time length of audio data 1101 is 0 to T6, the audio data 1101 is divided into six data segments (a data segment 1 to a data segment 6), there is a time period in a background sound audio track 1102 of the audio data and in which a background sound signal source from T3 to T6 generates a sound, and there is a time period in a voice track 1103 of the audio data and in which a voice signal source from T1 to T5 generates a sound.

In this aspect of this disclosure, each segment in the audio track is distinguished by using types such as voice and background sound, so that a voice data segment in the audio data can be directly located, and a higher weight value is allocated to the voice data segment than another type of data segment, so that identification of semantic information of the voice data segment can be enhanced, and a proportion of the voice semantic information in locating of a brilliant segment is greatly improved.

Still referring to FIG. 3A, in step 303, a corresponding weight value is allocated to each data segment in the audio data based on a length of the included time period, and weight values are concatenated to form a weight value sequence of the audio data.

For example, to facilitate processing of the audio data, the audio data is divided into multiple data segments according to a quantity of frames or duration in advance. For example, a length of the data segment is a preset quantity of frames or preset duration. By determining a length of a time period included in the data segment, a corresponding weight value is allocated to the data segment. For example, a time length of a time period of a voice signal source is 0, a weight value corresponding to a voice type is not allocated, a time length corresponding to a time period of a background sound is the same as playback duration of a data segment, and a preconfigured weight value corresponding to the background sound is allocated to the data segment. For another example, if the time length corresponding to the time period of the background sound is half of the playback duration of the data segment, half of the preconfigured weight value is used as the weight value of the data segment.

In some aspects, when audio track data of two signal source types, that is, voice and a background sound, is obtained through signal source separation, FIG. 3C is a third schematic flowchart of an audio data processing method according to an aspect of this disclosure. Step 303 in FIG. 3A is implemented by performing step 3031 to step 3033 in FIG. 3B, and processing in the following step 3031 to step 3033 is performed on each data segment, which is specifically described below.

For example, an execution sequence of step 3031 to step 3033 is not limited.

In step 3031, based on a parameter of the voice corresponding to the data segment in a case that the data segment belongs to the time period related to the voice, a weight value corresponding to the data segment is determined.

Herein, the weight value is positively correlated with the parameter, and the parameter includes at least one of the following: speech speed, intonation, and loudness.

For example, a movie and television play video is used as an example for description. Audio data of the movie and television play video includes voice and a background sound, a voice part is generally performed by an actor, and a brilliant data segment (a recommended segment) in the movie and television play is generally in a time period in which voice exists. Parameters such as a speech speed, intonation, and loudness of the voice may be used as a basis for determining a brilliant data segment, and a weight value corresponding to the data segment may be determined based on at least one of the parameters.

In step 3032, a preset value is used as a weight value corresponding to the data segment in a case that the data segment belongs to the time period related to the background sound.

Herein, the preset value is less than a weight value of any data segment related to the voice.

For example, the audio data of the movie and television play video includes voice and a background sound, and the voice part is generally performed by an actor. A part in which only a background sound exists is generally a data segment such as an interlude in the movie and television play video, and a background sound-related time period may be assigned a weight value less than that of the voice-related data segment. For another example, in audio data of an audio novel, a brilliant data segment is located in a voice part, and a time period in which only a background sound exists mat be allocated a smaller weight value.

In step 3033, zero is used as a weight value corresponding to the data segment in a case that the data segment does not belong to any time period related to the signal source type.

For example, when the data segment is not in a time period of any signal source type, the data segment may be a mute or noise data segment, and accuracy of obtaining the recommendation parameter may be improved by setting the weight value of the data segment to zero.

In some aspects, there are the following cases: The data segment is in a time period of any signal source type, the data segment is not in a time period of any signal source type, and the data segment is in time periods of multiple signal source types at the same time (for example, a time period in which the data segment is located in the playback time line, where both voice track data and background sound track data exist). When the data segment is in time periods of multiple signal source types at the same time, weight values corresponding to the data segment in different signal source types are obtained, and weighted summation is performed on the weight values to obtain the weight value of the data segment.

For example, to facilitate understanding of the process of obtaining the weight value of the data segment, the following describes the process with reference to the accompanying drawings. FIG. 11 is a schematic diagram of audio data according to an aspect of this disclosure. The time length of the audio data 1101 is 0 to T6, the audio data 1101 is divided into six data segments (the data segment 1 to the data segment 6), a time period of a background sound from T3 to T6 exists in the background sound audio track 1102 of the audio data, a time period of voice from a middle point of T1 and T2 to T5 exists in the voice track 1103 of the audio data, a time interval corresponding to the data segment 1 is T0 to T1, a time interval corresponding to the data segment 2 is T1 to T2, a time interval corresponding to the data segment 3 is T2 to T3, a time interval corresponding to the data segment 4 is T3 to T4, a time interval corresponding to the data segment 5 is T4 to T5, and a time interval corresponding to the data segment 6 is T5 to T6.

For the data segment 1, the data segment 1 is not related to any signal source, and a weight value of the data segment 1 is 0. For the data segments 2 and 3, the data segments 2 and 3 belong to a voice-related time period. A weight value is obtained by using step 3031 in the foregoing. Details are not described herein again. Duration of the voice-related time period included in the data segment 2 is half of duration of the data segment 2. Therefore, half of the weight value obtained according to step 3031 is used as a weight value q2 of the data segment 2. It is assumed that the weight values of the data segments 2 and 3 are respectively q2 and q3. For the data segments 4 and 5, the data segments 4 and 5 belong to both a voice-related time period and a background-sound-related time period. The data segment 4 is used as an example. Weight values of the data segment for different signal source types are separately obtained in steps 3031 and 3032, and the weight values of all the signal source types are weighted and summed to obtain a weight value q4=(aY+bB) of the data segment 4, where Y is a weight value of voice of the data segment 4, B is a weight value of a background sound of the data segment 4, and a and b are coefficients respectively. For the data segment 6, the data segment 6 is related to only the background sound, and a preset value corresponding to the background sound is obtained as a weight value q6 of the data segment 6, and weight values of all data segments are concatenated according to a time sequence of the data segments to obtain a weight value sequence [0, q2, q3, q4, q5, q6] of the audio data 1101. The weight values q3 to q5 determined based on parameters corresponding to the voice are higher than 0 and q6.

In this aspect of this disclosure, a weight value corresponding to a data segment is determined in different manners according to a type corresponding to the data segment. When the data segment allocates a preset weight value to a background sound, or when the data segment belongs to a mute or noise data segment, the weight value is set to zero, thereby saving a calculation resource for obtaining the weight value of the data segment. When the data segment belongs to a voice-related time period, calculating a weight value of the data segment based on a voice-related parameter improves accuracy of obtaining the weight value of the voice data segment. A weight value of a non-voice-related data segment is set to a preset value or zero, and a weight value of a voice data segment is determined according to a voice-related parameter, so that the weight value corresponding to the voice data segment is higher than that of the non-voice-related data segment. In a video and audio, a recommended segment generally is a data segment in which voice exists, and increasing the weight value of the voice data segment improves accuracy of predicting a recommendation parameter of each data segment.

In some aspects, when audio track data of one signal source type, that is, a background sound, is obtained through signal source separation, FIG. 3D is a fourth schematic flowchart of an audio data processing method according to an aspect of this disclosure. Step 303 in FIG. 3A is implemented by performing step 3034 and step 3035 in FIG. 3D, and processing in the following step 3034 and step 3035 is performed on each data segment, which is specifically described below.

For example, an execution sequence of step 3034 and step 3035 is not limited.

In step 3034, based on a parameter of the background sound corresponding to the data segment in a case that a time period included in the data segment belongs to the time period related to the background sound, a weight value corresponding to the data segment is determined.

Herein, the weight value is positively correlated with the parameter, and the parameter includes at least one of the following: loudness and tone.

For example, assuming that the audio data is audio data of a concert, the audio data includes only a background sound signal source but does not necessarily have voice. Parameters such as a tone and loudness may be used as a basis for determining a brilliant data segment, and a weight value corresponding to the data segment may be determined based on at least one of the parameters.

In step 3035, zero is used as a weight value corresponding to the data segment in a case that a time period included in the data segment does not belong to any time period related to the signal source type.

For example, content of step 3035 is the same as content of step 3033, and details are not described herein again.

In this aspect of this disclosure, when no voice exists in multimedia data, a preset weight value is allocated to a data segment that belongs to a background sound, and a weight value is set to zero for a data segment that belongs to a mute or noise, thereby saving a calculation resource for obtaining a weight value of a data segment.

Still referring to FIG. 3A, in step 304, an audio feature is extracted from each data segment, audio features of the data segments are concatenated to form an audio feature sequence of the audio data, and the audio feature sequence is encoded to obtain an attention parameter sequence of the audio data.

For example, the extracting an audio feature from each data segment is implemented in the following manner: performing feature extraction on the audio data to obtain a separate frequency domain feature or a separate time domain feature.

In some aspects, before step 304, the audio feature may be obtained in the following manner, and the following processing may be performed on each data segment in the audio data: extracting a time-domain signal feature and a frequency-domain signal feature of the data segment; determining, based on at least one time period that is in a playback time line of each piece of audio track data and that is related to the signal source type, a one-dimensional time-domain weight value corresponding to the time-domain signal feature, and determining a two-dimensional frequency-domain weight value corresponding to the frequency-domain signal feature; performing multiple levels of convolution on a product of the one-dimensional time-domain weight value and the time-domain signal feature to obtain a time-domain audio feature; performing multiple levels of convolution on a product of the two-dimensional frequency-domain weight value and the frequency-domain signal feature to obtain a frequency-domain audio feature; resizing the time-domain audio feature to obtain a two-dimensional time-domain audio feature; and fusing the two-dimensional time-domain audio feature with the frequency-domain audio feature to obtain the audio feature of the data segment.

For example, the time-domain audio feature is a one-dimensional feature, and may be resized to facilitate fusion between the time domain feature and the frequency domain feature. For example, the one-dimensional feature is processed by using a reshape function, to obtain a two-dimensional feature in which a quantity of elements does not change.

Figure 6B:
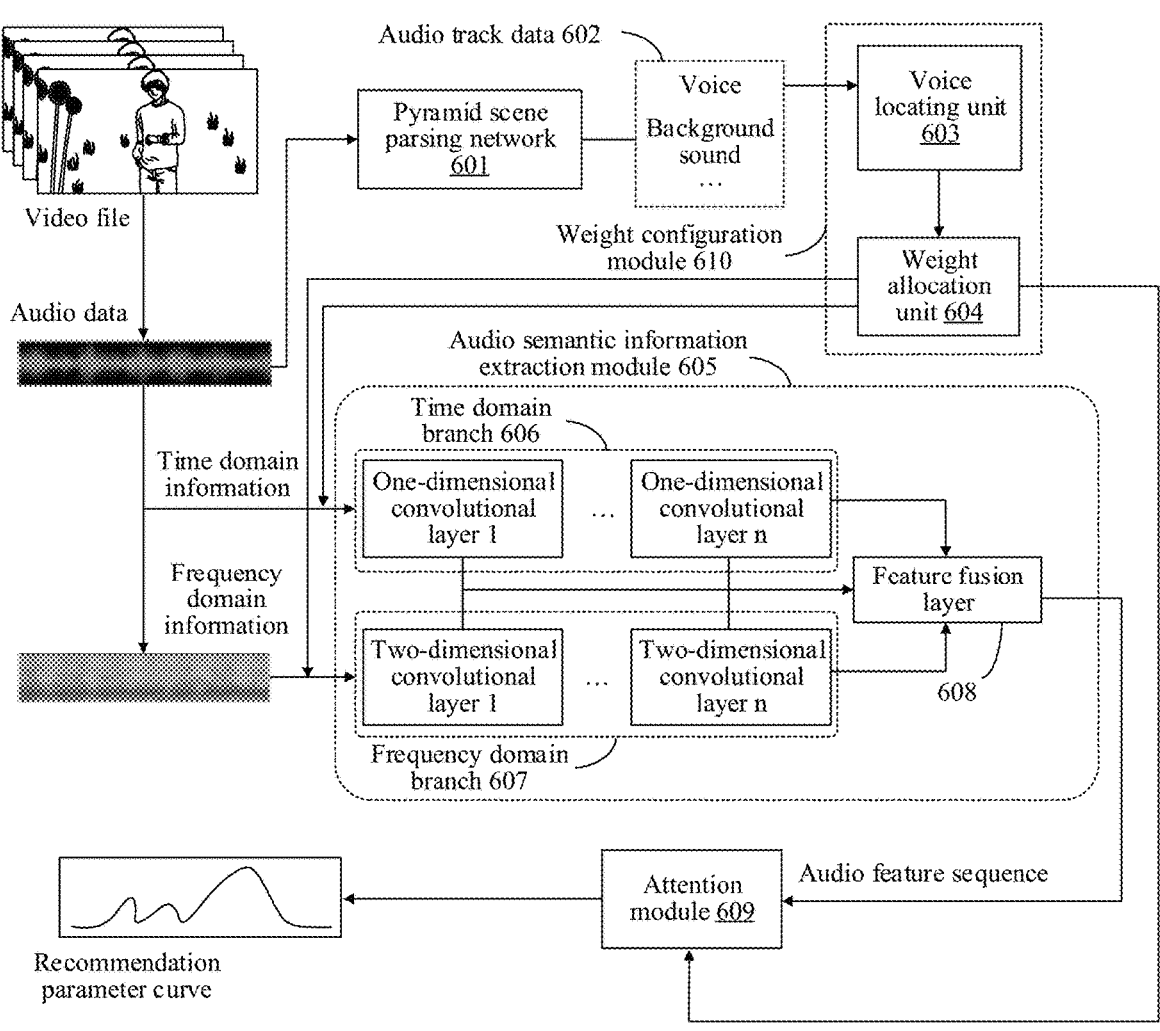
FIG. 6B is a second schematic diagram of an audio processing model according to an aspect of this disclosure.

FIG. 6B is a second schematic diagram of an audio processing model according to an aspect of this disclosure. Step 304 may be implemented by using an audio semantic information extraction module 605 in FIG. 6B. A structure of the audio semantic information extraction module 605 is a dual-stream type, including a time domain branch 606 and a frequency domain branch 607. Time domain information of audio data and a weight value sequence are inputted to the time domain branch 606. The time domain branch 606 includes multiple one-dimensional convolutional layers (a one-dimensional convolutional layer 1, . . . , and a one-dimensional convolutional layer n). Frequency domain information of the audio data and the weight value sequence are inputted to the frequency domain branch 607. The frequency domain branch 607 includes multiple two-dimensional convolutional layers (a two-dimensional convolutional layer 1, . . . , and a two-dimensional convolutional layer n). A feature fusion layer 608 is configured to fuse frequency domain features or time domain features that are outputted by all convolutional layers of the two branches.

Figure 8:
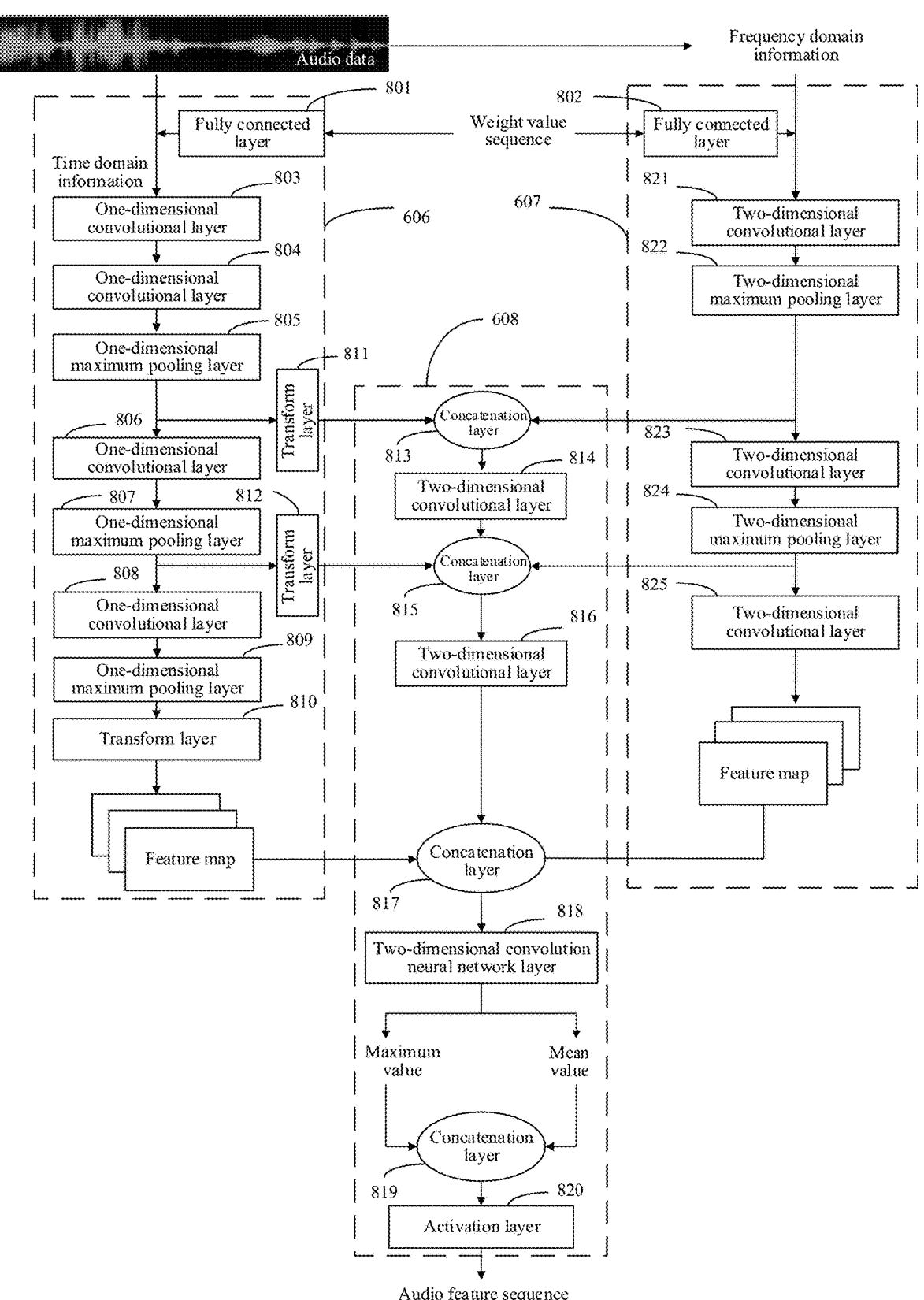
FIG. 8 is a schematic diagram of an audio semantic information extraction module according to an aspect of this disclosure.

The following provides detailed description. FIG. 8 is a schematic diagram of an audio semantic information extraction module according to an aspect of this disclosure. FIG. 8 is a detailed structural diagram of the audio semantic information extraction module 605 in FIG. 6B. An input to the audio semantic information extraction module is original audio data of a video (represented as an audio sampling point sequence). The audio data is divided into multiple data segments (for example, the division is as follows: each data segment includes at least one frame, or each data segment has an equal length). A basic feature map (logmel) generated based on the audio data is used as frequency domain information, and is inputted to the frequency domain branch 607. The audio sampling point sequence (time domain information) of the audio data is inputted to the time domain branch 606. The weight value sequence outputted by the weight allocation unit 604 separately generates time weight vectors with the same dimension as a time-domain signal feature and a frequency-domain signal feature through processing by the fully connected layer 801 and the fully connected layer 802, and then separately multiplies them by the time-domain signal feature and the frequency-domain signal feature at corresponding locations.

The time domain branch 606 includes a large quantity of one-dimensional convolutional layers (a one-dimensional convolutional layer 803, a one-dimensional convolutional layer 804, a one-dimensional convolutional layer 806, and a one-dimensional convolutional layer 808) and a large quantity of one-dimensional maximum pooling layers (a one-dimensional maximum pooling layer 805, a one-dimensional maximum pooling layer 807, and a one-dimensional maximum pooling layer 809), and uses a large quantity of convolutional layers in the time-domain signal feature to directly learn a time domain feature of the audio data, especially information such as audio loudness and sampling point amplitude. After the large quantity of one-dimensional convolutional layers is passed, a generated one-dimensional sequence is resized by using a transform layer 810 to become a two-dimensional feature map in a form of a wave graph. This processing causes that sizes of features outputted by the time domain branch and the frequency domain branch are the same, thereby facilitating fusion processing.

For example, in a one-dimensional convolutional process of the time domain branch, an intermediate result is resized into a two-dimensional wave graph by using transform layers (a transform layer 811 and a transform layer 812), and concatenation layers (for example, a concatenation layer 813 and a concatenation layer 815) and two-dimensional convolutional layers (for example, a two-dimensional convolutional layer 814 and a two-dimensional convolutional layer 816) are used for performing multiple levels of concatenation with an intermediate result of the frequency domain branch 607, so that finally obtained audio features can be fused with frequency domain features and time domain features of different sizes and at different layers.

Frequency domain information outputted by the frequency domain branch 607 may be a log-mel spectrum that uses mel frequency domain. The frequency domain branch 607 includes a large quantity of two-dimensional convolutional layers (a two-dimensional convolutional layer 821, a two-dimensional convolutional layer 823, and a two-dimensional convolutional layer 825) and a large quantity of two-dimensional maximum pooling layers (a two-dimensional maximum pooling layer 822 and a two-dimensional maximum pooling layer 824), and uses a large quantity of convolutional layers in the frequency-domain signal feature to directly learn a frequency domain feature of the audio data. After the large quantity of two-dimensional convolutional layers is passed, a two-dimensional feature map is obtained, and a dimension of the two-dimensional feature map is the same as a dimension of the feature map outputted by the time domain branch 606.

For example, in a two-dimensional convolutional process of the frequency domain branch, concatenation layers (for example, a concatenation layer 813 and a concatenation layer 815) and two-dimensional convolutional layers (for example, a two-dimensional convolutional layer 814 and a two-dimensional convolutional layer 816) are used for performing multiple levels of concatenation with the intermediate result of the time domain branch 606, so that finally obtained audio features can be fused with frequency domain features and frequency domain features of different sizes and at different layers.

For example, the transform layer may transform the feature map by using a reshape function (a function that transforms a specified matrix into a specific dimension matrix, where a quantity of elements in the matrix remains unchanged, and the function can readjust a quantity of rows, a quantity of columns, and a quantity of dimensions of the matrix).

In some aspects, the fusing the two-dimensional time-domain audio feature with the frequency-domain audio feature to obtain the audio feature of the data segment is implemented in the following manner: performing superposition processing on a superposition feature of the two-dimensional time-domain audio feature and the frequency-domain audio feature, and performing two-dimensional convolution on the superposition feature obtained through superposition processing to obtain a two-dimensional convolution result, to obtain a maximum superposition feature and a mean superposition feature of the two-dimensional convolution result; and performing linear activation on a sum between the maximum superposition feature and the mean superposition feature to obtain the audio feature of the data segment.

As an example of superposition processing, a two-dimensional time-domain audio feature and a frequency-domain audio feature may be separately represented as feature matrices, and a feature matrix of the two-dimensional time-domain audio feature and a feature matrix of the frequency-domain audio feature are linearly added to obtain a superposition feature, and the superposition feature is represented in a form of a feature matrix.

For example, in this aspect of this disclosure, an audio feature is represented in a vector form. Linear activation, that is, activation processing is performed, by using a Relu function, on the sum between the maximum superposition feature and the mean superposition feature, to obtain the audio feature of the data segment. Still referring to FIG. 8, the concatenation layer 817 in the feature fusion module 608 concatenates feature maps outputted by the two branches, and concatenation processing keeps information complementary in time domain and frequency domain, while still allowing a higher-layer network to perceive bottom-layer network information. The concatenation layer 817 outputs a two-dimensional frequency domain feature map of each data segment, and inputs the two-dimensional frequency domain feature map into the two-dimensional convolutional neural network layer 818; and obtains a two-dimensional convolution result, obtains a mean value and a maximum value of the last one-dimensional feature of the two-dimensional convolutional neural network layer based on the two-dimensional convolution result, adds the obtained mean value and maximum value by using a concatenation layer 819, and generates a final audio semantic feature vector (audio feature) by using the sum, a linear activation function (relu), and an activation layer 820. Audio semantic feature vectors of data segments are concatenated according to a time sequence corresponding to the data segments to obtain an audio feature sequence.

In this aspect of this disclosure, a time domain feature is transformed into a feature with the same dimension as a frequency domain feature, so that complexity of fusion of the time domain feature and the frequency domain feature of audio data is reduced, a calculation resource is saved, and accuracy of feature fusion is improved. Information included in audio can be obtained from different aspects through mutual fusion of the frequency domain feature and the time domain feature, so that an amount of information represented by the audio feature is more comprehensive, and precision of obtaining an audio feature is improved.

In some aspects, only the frequency domain feature or the time domain feature of the audio data may be collected as the audio feature of the audio. In a manner of collecting only one domain feature, a calculation speed can be increased, and a calculation resource can be saved.

In some aspects, FIG. 3E is a fifth schematic flowchart of an audio data processing method according to an aspect of this disclosure. Encoding the audio feature sequence to obtain an attention parameter sequence of the audio data in step 304 in FIG. 3A is implemented in step 3041 to step 3043 in FIG. 3E.

In step 3041, the following processing for each audio feature in the audio feature sequence is performed: separately fusing the audio feature and each audio feature of another data segment based on an attention mechanism to obtain each weighted correlation degree corresponding to the audio feature.

Herein, the another data segment is a data segment in the audio data other than a data segment that currently obtains a weighted correlation degree.

For example, the following uses an audio feature A as an example. In fusion processing, an inner product is performed between an embedding vector of the audio feature A and an embedding vector of an audio feature of any another data segment, and a result of the inner product is multiplied by the audio feature A to obtain a weighted correlation degree of the audio feature A. If a weighted correlation degree is obtained for an audio feature of each another data segment, each weighted correlation degree corresponding to the audio feature A is obtained.

In some aspects, before step 3041, the embedding vector of each audio feature is determined in the following manner: performing full connection on an audio feature of each data segment of the audio data by using a fully connected layer to obtain an embedding vector of each audio feature.

Figure 9:
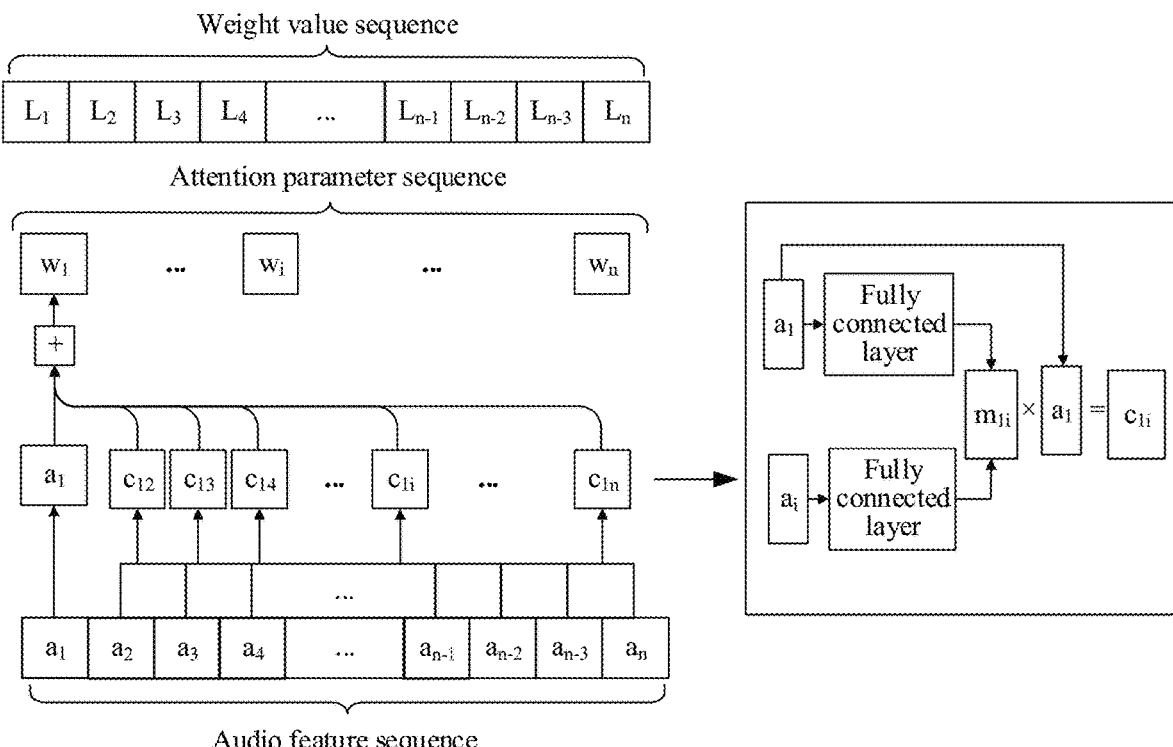
FIG. 9 is a schematic diagram of a principle of encoding in an attention module according to an aspect of this disclosure.

For example, FIG. 9 is a schematic diagram of a principle of encoding in an attention module according to an aspect of this disclosure. Assume that the audio feature sequence includes multiple audio features including $a_1$ to $a_n$, and audio features corresponding to each two data segments are processed by using a fully connected layer to obtain one-dimensional embedding vectors corresponding to the audio features (orders of the two vectors are the same).

In some aspects, step 3041 is implemented in the following manner: performing the following processing for the audio feature and each audio feature of the another data segment: multiplying an embedding vector of the audio feature by an embedding vector of the another data segment to obtain a correlation degree between the audio feature and the audio feature of the another data segment; and multiplying the audio feature by the correlation degree to obtain a weighted correlation degree corresponding to the audio feature.

For example, still referring to FIG. 9, an audio feature is represented in a form of a one-dimensional embedding vector, and internal product calculation is performed on two one-dimensional embedding vectors to obtain a correlation degree m. For example, the first audio feature in the audio feature sequence is represented as $a_1$, an ith audio feature is represented as $a_i$, and a correlation degree obtained by multiplying the audio feature $a_1$ by the audio feature $a_i$ is $m_{1i}$. The correlation degree is multiplied by the audio feature $a_1$ to obtain a weighted correlation degree $c_{1i}$.

In step 3042, the weighted correlation degrees are added to obtain an attention parameter corresponding to the audio feature.

For example, still referring to FIG. 9, the weighted correlation degree $c_{1i}$ between the audio feature $a_1$ and the audio feature $a_i$ is obtained according to $m_{1i} \times a_1 = c_{1i}$. All weighted correlation degrees corresponding to the same audio feature may be added to obtain an attention parameter W corresponding to the audio feature, for example, the attention parameter $$W_1 = \sum_{i=1}^{n} c_{1i}$$

of the audio feature $a_1$.

In step 3043, attention parameters are concatenated based on a sequence of data segments corresponding to each audio feature to form the attention parameter sequence of the audio data.

For example, the sequence of data segments is a time sequence of the data segments in the audio data. Attention parameters in the attention parameter sequence are in a one-to-one correspondence with the data segments. All attention parameters are concatenated into the attention parameter sequence according to a time sequence of data segments corresponding to the attention parameters. All weight values in the weight value sequence are also in a one-to-one correspondence with the data segments, and all weight values are concatenated into the weight value sequence according to a time sequence of data segments corresponding to the weight values.

In this aspect of this disclosure, an attention parameter is obtained by concatenating audio features based on an attention mechanism, and a recommendation parameter can be more accurately determined based on the attention parameter, thereby improving accuracy of determining a recommended segment, and resolving a problem that it is difficult to determine a recommended segment for audio data or video data that lacks playback record data.

Still referring to FIG. 3A, in step 305, the attention parameter sequence and the weight value sequence are fused to obtain a fusion parameter of each data segment, and a recommendation parameter of each data segment is determined based on each fusion parameter.

For example, fusion processing is to multiply the attention parameter sequence by the weight value sequence, and a quantity of elements included in the attention parameter sequence is the same as a quantity of elements included in the weight value sequence.

In some aspects, step 305 is implemented in the following manner: performing the following processing for each data segment: obtaining, from the attention parameter sequence, an attention parameter corresponding to the data segment, and multiplying a weight value of the data segment by the attention parameter of the data segment to obtain the fusion parameter of the data segment; and performing normalization processing on the fusion parameter to obtain the recommendation parameter of the data segment.

For example, assuming that the weight value sequence of the audio data is [Q1, Q2, . . . , Qn], and the attention parameter sequence is [Z1, Z2, . . . , Zn], a fusion parameter of the first data segment in the audio data is Q1*Z1, that is, a product of a weight value and an attention parameter of the first data segment.

For example, normalization processing is to perform confidence degree prediction by using a softmax function. That the recommendation parameter is a brilliant degree is used as an example. For a movie and television play video, a probability that a part in which voice exists in the video is a brilliant data segment is higher. A corresponding weight value is allocated based on audio track data of a voice signal source, and the weight value of the voice signal source is higher than a weight value of a background sound part, so that a brilliant degree confidence degree corresponding to the voice data segment is higher than a brilliant degree confidence degree corresponding to a background sound data segment.

In this aspect of this disclosure, an attention parameter is fused with a weight value, a recommendation parameter is determined based on a fusion parameter, and information about frequency domain and time domain and information about a signal source type are concatenated, so that the recommendation parameter can more comprehensively quantize information that represents audio data, thereby improving precision of determining the recommendation parameter.

In step 306, a recommended segment in the audio data is determined based on the recommendation parameter of each data segment.

In some aspects, the recommended segment of the audio data is determined in any one of the following manners:

1. Perform descending sorting on each data segment based on the recommendation parameter of each data segment, and use at least one data segment starting from the head in a descending sorting result as the recommended segment of the audio data. For example, descending sorting is performed on a brilliant degree of each data segment, a preset quantity of data segments in a header is used as brilliant data segments, and the preset quantity is positively related to a total quantity of data segments in the audio data. For example, the preset quantity is 1% of the total quantity of data segments.

2. Use a data segment whose recommendation parameter is greater than a recommendation parameter threshold as the recommended segment. For example, the recommendation parameter threshold may be a median value of the recommendation parameter of each data segment, or a preset multiple of the median value (for example, 1.5 times, and 1<the preset multiple<2). It is assumed that a maximum recommendation parameter is 0.9, a minimum recommendation parameter is 0, a median value 0.45 is used as the recommendation parameter threshold, and a data segment whose brilliant degree is greater than 0.45 is used as a brilliant data segment. It is further assumed that the maximum recommendation parameter is 0.9, the minimum recommendation parameter is 0, and 1.1 times of the median value is the recommendation parameter threshold, the recommendation parameter threshold is 0.495.

In this aspect of this disclosure, a recommendation parameter is used for quantizing a correlation degree between each data segment in audio data and a signal source, the recommendation parameter is used for representing a probability that the audio data belongs to a specific type of recommended segment. Multiple data segments with a highest recommendation parameter are selected as recommended segments. The selected recommended segment may represent a specific type of location in the audio data. Compared with prediction only from perspectives of frequency domain and time domain, identification is more comprehensive with reference to different signal sources, and a valuable recommended segment can be accurately identified based on a recommendation parameter of each data segment, which provides accurate reference information for a user.

In some aspects, after step 305, a recommendation parameter curve of the audio data may be further generated based on the recommendation parameter of each data segment. The recommendation parameter curve of the audio data is displayed on a playback interface in response to a playback trigger operation.

Herein, a horizontal coordinate of the recommendation parameter curve is playback time of the audio data, and a vertical coordinate of the recommendation parameter curve is the recommendation parameter.

Figure 10A:
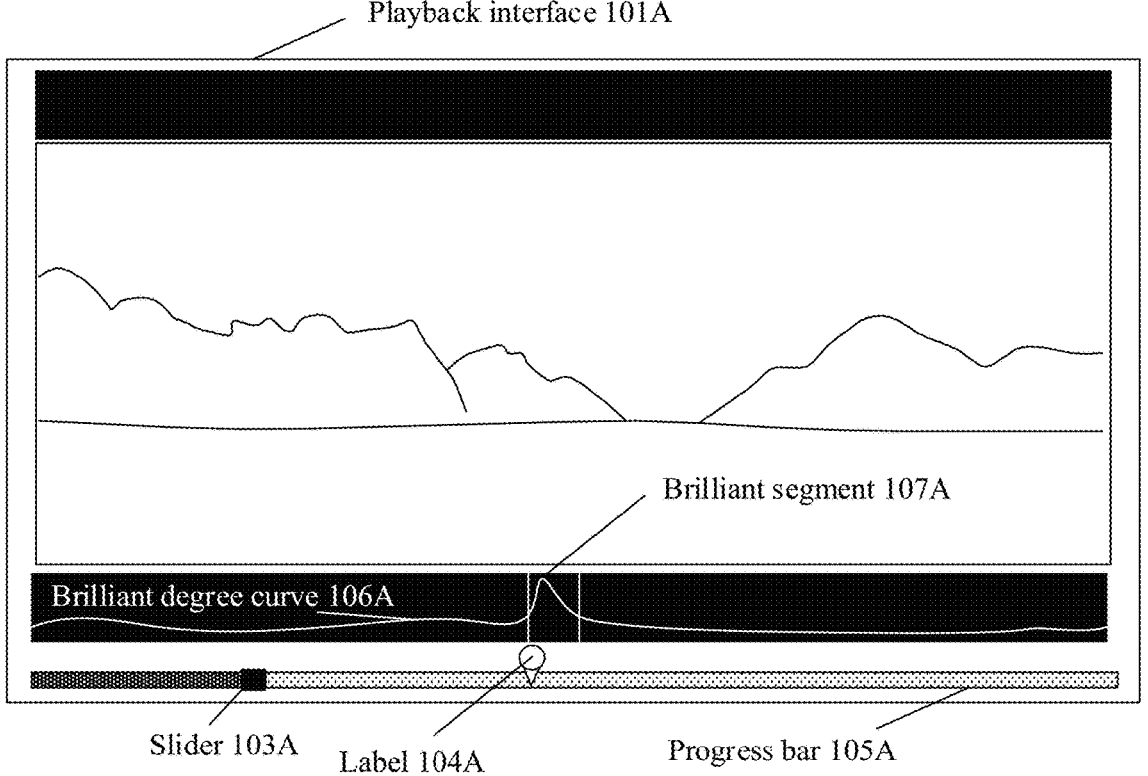
FIG. 10A is a first schematic diagram of a playback interface according to an aspect of this disclosure.

For example, horizontal coordinates of the recommendation parameter curve are in a one-to-one correspondence with the playback time of the audio data. A higher vertical coordinate of the recommendation parameter curve indicates a larger recommendation parameter. FIG. 10A is a first schematic diagram of a playback interface according to an aspect of this disclosure. A playback interface 101A is a playback interface of a video player, and a recommendation parameter is a brilliant degree. A brilliant degree curve 106A is displayed in an area that does not block a video picture, and a brilliant data segment 107A is annotated. A location of a slider 103A in a progress bar 105A is a location corresponding to a moment at which the video is currently played. The progress bar 105A may represent playback time. The brilliant degree curve 106A can represent the brilliant degree.

For example, a playback trigger operation may be for audio or a video. The playback interface may be an audio playback interface or a video playback interface. In this case, the audio playback interface plays the audio data (corresponding to an audio playback scenario and the audio data), the video playback interface is corresponding to the video playback scenario, and the audio data is extracted from video data.

In some aspects, after step 306, a label of the recommended segment may also be displayed on the playback interface, the label being used for representing a time period of the recommended segment; and in response to a selection operation for any label, a start point of a recommended segment corresponding to the selected label is jumped to start playback.

Figure 10B:
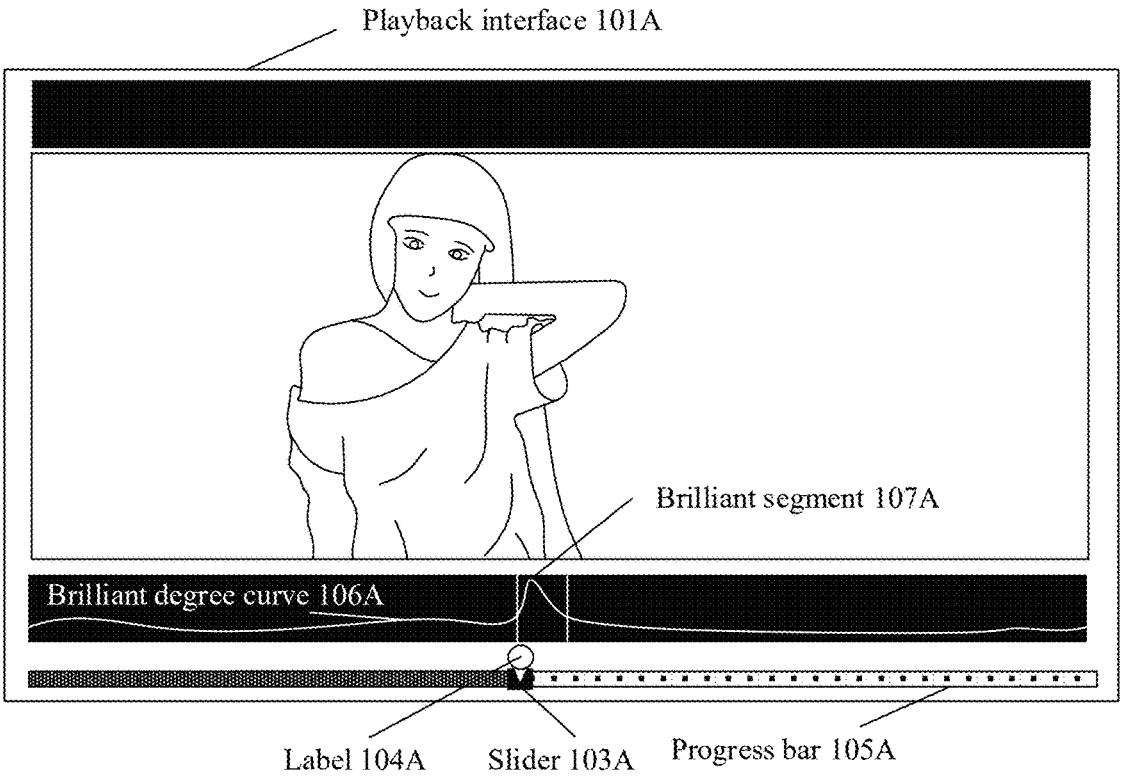
FIG. 10B is a second schematic diagram of a playback interface according to an aspect of this disclosure.

For example, the selection operation may be a tap operation or an operation of dragging the slider of the progress bar to the label. FIG. 10B is a second schematic diagram of a playback interface according to an aspect of this disclosure. The slider 103A is dragged to the location of the label 104A, and the video picture is switched to a picture at a start location of the brilliant data segment 107A.

In some aspects, the audio data processing method provided in this aspect of this disclosure is implemented by using an audio processing model. Signal source separation is implemented by invoking a pyramid scene parsing network of the audio processing model, audio feature extraction from each data segment is implemented by invoking an audio semantic information extraction module of the audio processing model, and encoding and fusion processing are implemented by invoking an attention module of the audio processing model.

FIG. 6A is a first schematic diagram of an audio processing model according to an aspect of this disclosure. The audio processing model includes a pyramid scene parsing network 601, a weight configuration module 610, an audio semantic information extraction module 605, and an attention module 609. The pyramid scene parsing network 601 is configured to perform step 301, the weight configuration module 610 is configured to perform step 303, the audio semantic information extraction module 605 is configured to perform step 304, and the attention module 609 is configured to perform step 305.

Audio data is inputted into the pyramid scene parsing network 601, and the pyramid scene parsing network 601 performs signal source separation on the audio data to obtain audio track data corresponding to at least one signal source type. The weight configuration module 610 is configured to implement step 303 in the foregoing. The weight configuration module 610 determines a time period that is in the audio track data and that is associated with the signal source, allocates a corresponding weight value to the time period, and outputs the weight value to the audio semantic information extraction module 605 and the attention module 609. The audio data is inputted to the audio semantic information extraction module 605 (for a specific structure of the audio semantic information extraction module, refer to FIG. 6B and FIG. 8). The audio semantic information extraction module 605 performs feature extraction processing on the audio data from two aspects of time domain and frequency domain, and outputs an audio feature sequence that concatenates time domain and frequency domain information to the attention module 609. The attention module 609 is an algorithm module configured to run an attention mechanism. The attention module 609 predicts a parameter by using the attention mechanism based on the weight value sequence and the audio feature sequence to obtain a recommendation parameter, and creates a recommendation parameter curve.

The audio processing model is trained in the following manner: concatenating, based on a label value of each actual recommended segment of the audio data (that is, the label value is a recommendation parameter of the actual recommended segment, and a label value of a positive sample is 1), to form an actual recommendation parameter sequence of the audio data; concatenating, based on the recommendation parameter of each data segment of the audio data, to form a predicted recommendation parameter sequence of the audio data; obtaining a cross-entropy loss of the audio processing model based on the actual recommendation parameter sequence and the predicted recommendation parameter sequence; and dividing the cross-entropy loss by a quantity of data segments of the audio data to obtain a mean prediction loss, and performing back propagation processing on the audio processing model based on the mean prediction loss to obtain an updated audio processing model.

For example, there is a manually annotated label value in training data, and the label value can represent a probability that actually which data segments are recommended segments (brilliant data segments). A recommended segment is annotated as 1 (a positive sample), and a non-recommended segment is annotated as 0 (a negative sample). During loss function calculation, all label values corresponding to one video may form an actual recommendation parameter sequence (a sequence formed by 0 and 1). For example, the video is divided into N data segments. N is a positive integer, and the recommended segment is a brilliant segment. A brilliant segment in the video is manually annotated. Label values are concatenated according to a time sequence of data segments in the video from the front to the back to obtain an actual recommendation parameter sequence. The actual recommendation parameter sequence is represented as [1, 0, 1, . . . , 0].

In some aspects, when the audio data is audio data captured in a video, a brilliant data segment may be determined based on an audio feature with reference to image information. This may be implemented in the following manner: Image feature extraction is performed on the image data of the video, and an image feature is fused with a corresponding audio feature to obtain a fused video feature; an attention mechanism is performed based on the video feature to obtain an attention parameter sequence; and a recommendation parameter sequence is determined based on the attention parameter sequence and a weight value sequence.

In some aspects, when the audio data is audio data captured in a video, a recommended segment identified based on the audio data may be optimized based on a recommended segment identified based on an image feature of the video, which is implemented in the following manner: performing image identification on image data of the video, and determining, based on an identified video image that includes a person, data segment time that includes the person in the video. A video data segment whose recommendation parameter is greater than the recommendation parameter threshold and that includes a person is used as a recommended segment.

For example, a brilliant data segment of video data may be further determined in the following manner: performing feature extraction processing on image data (a video picture) of the video to obtain an image semantic feature sequence of the video; performing image identification on the image data of the video to obtain data segment time that includes a person in the video, and allocating a corresponding weight value sequence to the video based on the data segment time of the person; obtaining an attention parameter based on the image semantic feature sequence, to obtain an attention parameter sequence, and obtaining, based on the attention parameter sequence of the image data and the weight value sequence, a recommendation parameter corresponding to the video picture; and performing weighted summation on the recommendation parameter of the video picture and a recommendation parameter of audio data to obtain a weighted recommendation parameter, and using a video data segment whose weighted recommendation parameter is greater than a weighted recommendation parameter threshold as a recommended segment.

In this aspect of this disclosure, an entire video is analyzed from a perspective of an audio side in multiple domains and multiple layers of information, so that a recommended segment (for example, a brilliant data segment, a passionate data segment, a sad data segment, or a funny data segment) in entire audio can be quickly located, and a location of a time period of the recommended segment in the video on a time line can be determined based on the recommended segment of the audio. Therefore, in a case that playback record data of audio data is not relied on, the recommended segment can be accurately identified, and accurate reference information is provided for a user, thereby improving user experience. A video recommendation parameter curve can be provided for a player, so that an audience jumps from a playback progress bar from a current playback location to a location of the recommended segment, thereby improving experience of the audience using the player.

The following describes an example application of this aspect of this disclosure in an actual application scenario. The audio data processing method provided in this aspect of this disclosure may be applied in the following application scenarios:

1. In a process of playing a long video on different platforms (PC\TV\Android\iOS), popularity information associated with a time line progress bar of the video can be displayed in a player. The popularity information is usually obtained through calculation based on playback record data of the video (a playback quantity, a click volume, a bullet-screen comment quantity, or a comment quantity). However, for videos of newly released movies or movie and television plays, these videos have no playback record data. Alternatively, there is no enough playback record data to determine popularity of a niche video. According to the audio data processing method provided in this aspect of this disclosure, a recommendation parameter curve can be generated to replace popularity information. A recommendation parameter may be a brilliant degree, and a brilliant data segment and a brilliant degree curve in a video are displayed to a user. The user can directly jump to the brilliant data segment for viewing or listening according to the brilliant degree curve or a brilliant data segment label, to improve viewing experience of the user.

2. In some short video platforms, users often create secondary short videos based on movie and television plays. They typically watch the movie and television plays first and then locate a brilliant data segment from an entire play to obtain a collection of brilliant data segments. Based on the collection of brilliant data segments obtained by locating, a collection of secondary short videos is created. According to the audio data processing method provided in this aspect of this disclosure, a brilliant degree curve can be provided for a user who performs secondary creation. The user can clearly determine a brilliant data segment in a video according to the curve, and click to locate and intercept a picture of the brilliant data segment in the entire video. Then the user who performs secondary creation can directly perform subsequent short video generation according to an interception result, thereby greatly improving efficiency, and avoiding a time waste caused by manual determining of the brilliant data segment.

In the following, an example in which a recommendation parameter is a brilliant degree and audio data is audio data of a video of a movie and television play is used for description. FIG. 5 is a schematic flowchart of an audio data processing method according to an aspect of this disclosure. The following uses an electronic device as an execution entity to describe the audio data processing method with reference to steps in FIG. 5.

In step 501, a to-be-processed video file is obtained.

Figure 4A:
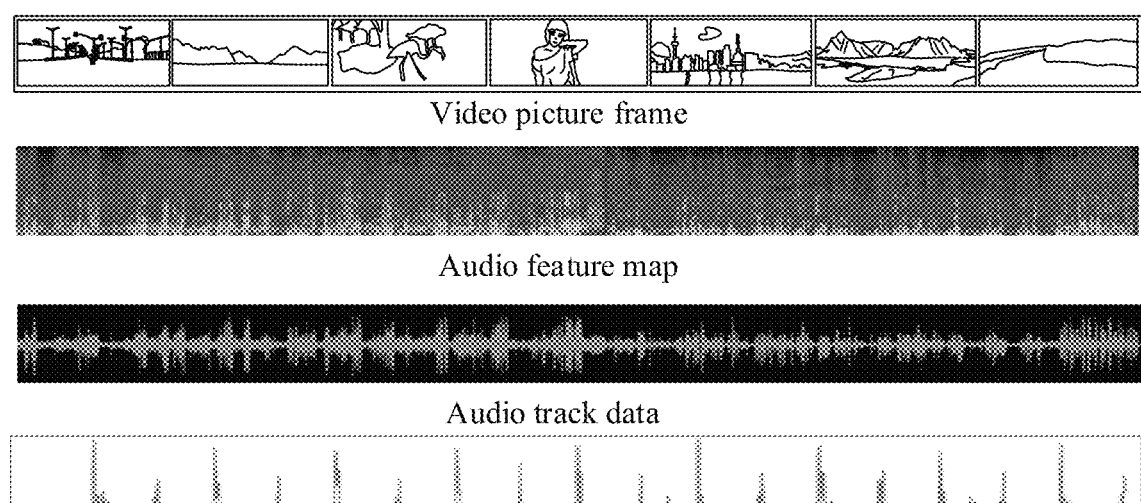
FIG. 4A is a schematic diagram of audio data extracted from a video according to an aspect of this disclosure.

For example, the to-be-processed video file may be a video file of a movie and television play or a movie. The video file includes a video picture frame and audio data, and audio track data corresponding to at least one signal source type may be extracted from the audio data. FIG. 4A is a schematic diagram of audio data extracted from a video according to an aspect of this disclosure. FIG. 4A shows a schematic diagram of a video picture frame (representing a preview picture of a video), an audio feature map of audio data, an audio sampling sequence diagram of audio track data, and a schematic diagram of a recommendation parameter curve from top to bottom. A horizontal coordinate of the recommendation parameter curve indicates time, and a vertical coordinate indicates a recommendation parameter.

In step 502, an audio processing model is invoked based on the audio data of the video file to perform brilliant confidence degree prediction processing, to obtain a brilliant confidence degree curve and a brilliant data segment of the audio data.

FIG. 6A is a first schematic diagram of an audio processing model according to an aspect of this disclosure. The audio processing model includes a pyramid scene parsing network 601, a weight configuration module 610, an audio semantic information extraction module 605, and an attention module 609. Audio data is inputted into the pyramid scene parsing network 601, and the pyramid scene parsing network 601 performs signal source separation on the audio data to obtain audio track data corresponding to at least one signal source type. The weight configuration module 610 determines a time period that is in the audio track data and that is associated with the signal source, allocates a corresponding weight value to the time period, and outputs the weight value to the audio semantic information extraction module 605 and the attention module 609. The audio data is inputted to the audio semantic information extraction module 605. The audio semantic information extraction module 605 performs feature extraction processing on the audio data from two aspects of time domain and frequency domain, and outputs an audio feature sequence that concatenates time domain and frequency domain information to the attention module 609. The attention module predicts a parameter based on the weight value sequence and the audio feature sequence to obtain a recommendation parameter, and creates a recommendation parameter curve.

The following describes modules in the audio processing model. FIG. 6B is a second schematic diagram of an audio processing model according to an aspect of this disclosure. The pyramid scene parsing network 601 and a voice locating unit 603 in the weight configuration module 610 perform millisecond level locating on voice segments in an entire audio track. The voice locating unit 603 uses a voice activity detection algorithm, and the pyramid scene parsing network 601 can better identify and locate separation details by using a pyramid-form convolutional layer network with perception levels from a larger perception domain to a smaller perception domain. By using the pyramid scene parsing network, different features in an audio spectrum map can be more accurately separated. In particular, a small convolutional layer in the pyramid convolutional layer can learn an edge of a boundary between spectrum maps of different signal sources in the audio spectrum map, and the spectrum map is separated by using the edge of the features of the different signal sources as a mask, so that audio track data of the different signal sources obtained through separation is more accurate. An original audio track of the video is inputted to the pyramid scene parsing network 601, and is outputted as separate audio track data such as a background sound audio track and a voice track (audio track data 602 in FIG. 6B). Then, the voice segment in the voice track is located by using a voice activity detection open source algorithm, to obtain a time period of voice in the entire track.

For example, the pyramid scene parsing network 601 separates audio tracks of the entire video based on a signal source separation model established by the pyramid scene parsing network, splits voice information and background sound information in the audio tracks, and separately stores them as audio track data (audio track file). The voice locating unit 603 locates a voice data segment in the voice track data based on the voice activity detection algorithm, to obtain a time period in which voice exists, and the weight allocation unit 604 sets a weight of a time period of each piece of voice. The time period of the voice is assigned a higher weight value than a time period of a pure background sound.

In this aspect of this disclosure, in a pyramid scene parsing network, feature maps of different layers generated by a pyramid pooling module are finally concatenated by using a concatenation layer, and the concatenated feature maps are concatenated, and then inputted to a fully connected layer for classification. The pyramid scene parsing network outputs, by using convolutional layers of multiple layers of the pyramid pooling module, local information that includes different scales and different sub-regions, and constructs global prior information on a final convolutional layer feature map of the pyramid scene parsing network. The purpose of the global prior information is to eliminate a limitation of a convolutional neural network on a fixed input size for image classification.

FIG. 7 is a schematic diagram of a pyramid scene parsing network according to an aspect of this disclosure. The following provides details. FIG. 7 is a detailed schematic structural diagram of the pyramid scene parsing network 601 in FIG. 6A and FIG. 6B. A convolutional neural network 701 performs feature extraction on audio data to obtain an original feature 702 of the audio data. A pyramid module (including a convolutional layer 1, a convolutional layer 2, a convolutional layer 3, and a convolutional layer 4) disposed after a pooling layer 703 may fuse features of four different pyramid scales in a specific implementation. The convolutional layer 1 highlights a single global pooled output of the roughest level, and multiple convolutional layers of different sizes of the pyramid module divide the original feature map into different sub-regions and form local features for different locations. The convolutional layers of different layers in the pyramid module output local features of different sizes. To maintain the weight of the global feature, assuming that there are N levels in the pyramid, 1×1 convolution is used after each level, and a quantity of channels at a corresponding level is reduced to 1/N of an original quantity. Then, a low-dimensional feature map is directly up-sampled by using bilinear interpolation through the up-sampling layer 704 to obtain a feature map of the same size as an original feature map. Finally, feature maps 705 of different levels that are outputted by the pyramid module are concatenated, and a result of the concatenation is convolved by using the convolutional layer 706, to obtain a final pyramid global feature. Still referring to FIG. 7, it can be learned that an architecture of a pyramid scene parsing model is in a pyramid shape. After an image is inputted into the model, a feature map is extracted by using a pre-trained atrous convolutional layer, and atrous convolution is also referred to as dilated convolution. A dilation rate is introduced into the convolutional layer, and the dilation rate defines a spacing between data values when convolutional cores process data. Because the introduction of the pooling layer leads to a loss of global information, the role of the atrous convolutional layer is to provide a greater sense field without using the pooling layer. A final feature mapping size is ⅛ of the input image, and then the feature is inputted into the pyramid pooling module. The model uses the pyramid pooling module in the pyramid scene parsing network to collect context information. The pyramid pooling module is a four-layer pyramid structure, and the pooling core covers all, half, and a small part of the image. They are fused into global prior information (global feature), the previous global feature mapping and the original feature mapping are concatenated in the last part, and then convolution is performed (using the global feature as a mask to separate voice and a background sound in the original feature) to generate a final segmentation feature map of the voice and the background sound.

Figure 4B:
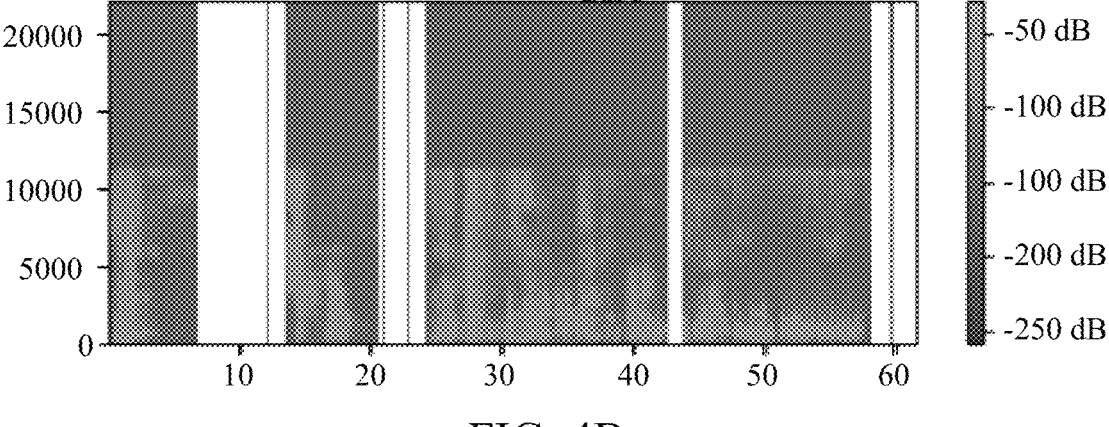
FIG. 4B is a schematic diagram of audio track data according to an aspect of this disclosure.

FIG. 4B is a schematic diagram of audio track data according to an aspect of this disclosure. In FIG. 4B, the upper figure is a sound track waveform diagram (sampling sequence diagram), the lower figure is a sound track feature map corresponding to voice, and a blank part in the sound track feature map is a discarded noise part. For example, a signal source separation model established by using a pyramid scene parsing network may separate audio track data respectively corresponding to voice and a background sound in an original audio track. A specific audio impulse signal period may be located based on the audio track data using a voice activity detection algorithm (for example, a WebRTC voice activity detection algorithm). The voice activity detection algorithm is an algorithm for determining, based on short time energy (STE) and a zero cross counter (ZCC), whether audio is voice. The short time energy, that is, energy of one frame of voice signal, is a sum of squares of intra-frame signals, and the zero cross counter is a quantity of times that one frame of voice time domain signal passes through 0 (time line). A principle of the voice activity detection algorithm is that short time energy of a voice data segment is relatively large, and a zero cross counter is relatively small. On the contrary, short time energy of a non-voice data segment is relatively small, but a zero cross counter is relatively large. Most of energy of a voice signal is included in a low frequency band, and energy of a noise signal is usually small and the noise signal contains information of a higher frequency band. Therefore, the two parameters of the voice signal may be measured and compared with thresholds respectively corresponding to the parameters, to distinguish a voice signal from a non-voice signal. When the short time energy of the audio data is less than a short time energy threshold and the zero cross counter is greater than the zero cross counter threshold, the audio segment is noise. On the contrary, when the short time energy of the audio data is greater than the short time energy threshold and the zero cross counter is less than the zero cross counter threshold, the audio segment is voice. FIG. 4C is a schematic diagram of a time period according to an aspect of this disclosure. A time period selected by a frame 401C is a time period of voice. Similarly, a waveform corresponding to each frame in FIG. 4C is a time period of voice.

Still referring to FIG. 6B, a structure of the audio semantic information extraction module 605 is a dual-stream type, including a time domain branch 606 and a frequency domain branch 607. Time domain information of audio data and a weight value sequence are inputted to the time domain branch 606. The time domain branch 606 includes multiple one-dimensional convolutional layers (a one-dimensional convolutional layer 1, . . . , and a one-dimensional convolutional layer n). Frequency domain information of the audio data and the weight value sequence are inputted to the frequency domain branch 607. The frequency domain branch 607 includes multiple two-dimensional convolutional layers (a two-dimensional convolutional layer 1, . . . , and a two-dimensional convolutional layer n). A feature fusion layer 608 is configured to fuse frequency domain features or time domain features that are outputted by all convolutional layers of the two branches.

The following provides detailed description. FIG. 8 is a schematic diagram of an audio semantic information extraction module according to an aspect of this disclosure. An input to the audio semantic information extraction module is original audio data of a video (represented as an audio sampling point sequence). The audio data is divided into multiple data segments (for example, the division is as follows: each data segment includes at least one frame, or each data segment has an equal length). A basic feature map (logmel) generated based on the audio data is used as frequency domain information, and is inputted to the frequency domain branch 607. The audio sampling point sequence (time domain information) of the audio data is inputted to the time domain branch 606. The weight value sequence outputted by the weight allocation unit 604 separately generates time weight vectors with the same dimension as a time-domain signal feature and a frequency-domain signal feature through processing by the fully connected layer 801 and the fully connected layer 802, and then separately multiplies them by the time-domain signal feature and the frequency-domain signal feature at corresponding locations.

The time domain branch 606 includes a large quantity of one-dimensional convolutional layers (a one-dimensional convolutional layer 803, a one-dimensional convolutional layer 804, a one-dimensional convolutional layer 806, and a one-dimensional convolutional layer 808) and a large quantity of one-dimensional maximum pooling layers (a one-dimensional maximum pooling layer 805, a one-dimensional maximum pooling layer 807, and a one-dimensional maximum pooling layer 809), and uses a large quantity of convolutional layers in the time-domain signal feature to directly learn a time domain feature of the audio data, including information such as audio loudness and sampling point amplitude. After the large quantity of one-dimensional convolutional layers is passed, a generated one-dimensional sequence is resized by using a transform layer 810 to become a two-dimensional feature map in a form of a wave graph. This processing causes that sizes of features outputted by the time domain branch and the frequency domain branch are the same, thereby facilitating fusion processing.

For example, in a one-dimensional convolutional process of the time domain branch, an intermediate result is resized into a two-dimensional wave graph by using transform layers (a transform layer 811 and a transform layer 812), and concatenation layers (for example, a concatenation layer 813 and a concatenation layer 815) and two-dimensional convolutional layers (for example, a two-dimensional convolutional layer 814 and a two-dimensional convolutional layer 816) are used for performing multiple levels of concatenation with an intermediate result of the frequency domain branch 607, so that finally obtained audio features can be fused with frequency domain features and time domain features of different sizes and at different layers.

Frequency domain information outputted by the frequency domain branch 607 may be a logmel spectrum that uses mel frequency domain. The frequency domain branch 607 includes a large quantity of two-dimensional convolutional layers (a two-dimensional convolutional layer 821, a two-dimensional convolutional layer 823, and a two-dimensional convolutional layer 825) and a large quantity of two-dimensional maximum pooling layers (a two-dimensional maximum pooling layer 822 and a two-dimensional maximum pooling layer 824), and uses a large quantity of convolutional layers in the frequency-domain signal feature to directly learn a frequency domain feature of the audio data. After the large quantity of two-dimensional convolutional layers is passed, a two-dimensional feature map is obtained, and a dimension of the two-dimensional feature map is the same as a dimension of the feature map outputted by the time domain branch 606.

For example, in a two-dimensional convolutional process of the frequency domain branch, concatenation layers (for example, a concatenation layer 813 and a concatenation layer 815) and two-dimensional convolutional layers (for example, a two-dimensional convolutional layer 814 and a two-dimensional convolutional layer 816) are used for performing multiple levels of concatenation with the intermediate result of the time domain branch 606, so that finally obtained audio features can be fused with frequency domain features and frequency domain features of different sizes and at different layers.

For example, the transform layer may transform the feature map by using a reshape function (a function that transforms a specified matrix into a specific dimension matrix, where a quantity of elements in the matrix remains unchanged, and the function can readjust a quantity of rows, a quantity of columns, and a quantity of dimensions of the matrix).

The concatenation layer 817 in the feature fusion module 608 concatenates feature maps outputted by the two branches, and concatenation processing keeps information complementary in time domain and frequency domain, while still allowing a higher-layer network to perceive bottom-layer network information. The concatenation layer 817 outputs a two-dimensional frequency domain feature map of each data segment, and inputs the two-dimensional frequency domain feature map into the two-dimensional convolutional neural network layer 818; and obtains a two-dimensional convolution result, determines a mean value and a maximum value of the two-dimensional convolution result, adds the obtained mean value and maximum value by using a concatenation layer 819, and generates a final audio semantic feature vector (audio feature) by using the sum, a linear activation function (relu), and an activation layer 820. Audio semantic feature vectors of data segments are concatenated to obtain an audio feature sequence.

Referring to FIG. 6B, the attention module 609 receives the weight value sequence and the audio feature sequence, the attention module encodes the audio feature sequence to obtain the attention parameter sequence, and predicts a recommendation parameter of each data segment based on the attention parameter sequence and the weight value sequence. FIG. 9 is a schematic diagram of a principle of encoding in an attention module according to an aspect of this disclosure.

For example, assuming that the audio feature sequence includes multiple audio features including $a_1$ to $a_n$, and audio features corresponding to each two data segments are processed by using a fully connected layer to obtain one-dimensional embedding vectors corresponding to the audio features (orders of the two vectors are the same), internal product calculation is performed on two one-dimensional embedding vectors to obtain a correlation degree m. For example, a correlation degree between an audio feature $a_1$ and an audio feature $a_i$ is $m_{1i}$. The correlation degree is multiplied by a vector corresponding to the audio feature, to obtain a weighted correlation degree information amount c (the foregoing weighted correlation degree). For another example, weighted correlation degree information between the audio feature $a_1$ and the audio feature $a_i$ is $c_{1i}$, and $m_{1i} \times a_1 = c_{1i}$. An attention parameter W corresponding to the audio feature may be obtained by adding each weighted correlation degree information amount corresponding to the audio feature, for example, the attention parameter $$W_1 = \sum_{i=1}^{n} c_{1i}$$

of the audio feature $a_1$.

Attention parameters corresponding to audio features of all data segments are obtained in the foregoing manner. For each data segment, an attention parameter W corresponding to the data segment is multiplied by a weight value L corresponding to the data segment, to obtain a final output feature sequence Q (a granularity of the feature sequence Q may be a frame level), and normalization processing is performed on a feature node of each granularity by using a binary classification layer. A label of binary classification is 1-0, and a posterior probability of a category 1 is a confidence degree (a brilliant degree) of the feature node, that is, represents a probability that a feature of the feature node is brilliant. Normalization processing (for example, by using a softmax function) is performed on the entire recommendation parameter sequence, to obtain a brilliant degree curve.

A corresponding brilliant degree threshold may be set, and a data segment whose brilliant degree is greater than the brilliant degree threshold is used as a brilliant data segment, and a data segment whose brilliant degree is less than the brilliant degree threshold is used as a non-brilliant data segment.

In some aspects, a manually annotated label exists in training data in a training process, and the label can represent actually which data segments are recommended segments (brilliant data segments). A recommended segment is annotated as 1 (a positive sample), and a non-recommended segment is annotated as 0 (a negative sample). During loss function calculation, all labels corresponding to one video may form one 0-1 sequence. A cross entropy loss function is calculated based on the recommendation parameter sequence and the label sequence (a length of the confidence degree sequence is the same as a length of the label sequence), and a loss function of the entire sequence is averaged to obtain a prediction loss of the model. Based on the prediction loss, the audio processing model may be trained in a back propagation manner.

In step 503, the recommendation parameter curve of the video file is displayed on a playback interface in response to a playback trigger operation.

For example, the recommendation parameter curve of the playback interface is bound to a progress bar on a time line of the playback interface. When the video is played on the playback interface, a brilliant degree curve is displayed above the progress bar. A higher brilliant degree indicates a higher value corresponding to the curve. The user may drag the progress bar according to the brilliant degree curve, and locate a brilliant data segment for viewing.

A beneficial effect of the audio data processing method provided in this aspect of this disclosure is as follows:

1. In this aspect of this disclosure, audio information is used for automatically identifying a brilliant data segment, and automatic locating can quickly and industrially locate a brilliant data segment. In some implemented applications, such as a heat curve (a brilliant degree curve) at a playback end, production can be rapidly batch-generated, production efficiency is improved, and production costs are reduced.

2. In this aspect of this disclosure, full-audio information is used as a feature input for locating a brilliant data segment, to compensate for a problem that a data segment whose picture is not highly brilliant but whose background sound is highly brilliant cannot be located (for example, a sitcom). In particular, the brilliant data segment can be located by using the picture, and only several shots with the highest brilliance in the entire picture can be located. Therefore, integrity of the entire brilliant data segment cannot be improved, but the entire data segment can be located by using audio. In addition, a common picture processing model has a relatively large parameter quantity, a brilliant data segment cannot be quickly predicted, and an audio network parameter is relatively small, which is more rapid and convenient.

3. In this aspect of this disclosure, a pyramid scene parsing network is used for constructing a signal source separation system, and then voice segment locating is performed by using a voice activity detection algorithm. In this method, complete voice can be detected, and not only voice information but also more complete voice data segment locating information can be learned by the entire signal source separation system.

4. In this aspect of this disclosure, time period information of voice is used for determining weight information of each node in an entire audio track. In this aspect of this disclosure, a voice data segment can be directly located, and a corresponding weight value is allocated to the voice data segment, so that semantic information of the voice data segment can be identified, and a proportion of the voice semantic information in locating of a brilliant data segment is greatly increased.

5. In this aspect of this disclosure, a multi-domain multi-layer method is used for extracting a semantic feature. Different network layers can complement information for each other in time domain and frequency domain, and frequency domain information is added to a time domain feature. Likewise, time domain information is added to a frequency domain feature. Therefore, a higher layer network perceives a bottom-layer network feature, and improves a perception domain of the entire model and complementarity between different features, to improve locating performance of the entire audio processing model.

The following continues to describe an example structure when the audio data processing apparatus 455 provided in the aspects of this disclosure is implemented as software modules. In some aspects, as shown in FIG. 2, the software modules stored in the audio data processing apparatus 455 of the memory 450 may include: a signal source separation module 4551, configured to perform signal source separation on audio data to obtain audio track data respectively corresponding to at least one signal source type; a weight configuration module 4552, configured to allocate a corresponding weight value to each data segment in the audio data based on the included time period length and at least one time period that is in a playback time line of each piece of audio track data and that is related to the signal source type, and concatenate weight values to form a weight value sequence of the audio data; a feature extraction module 4553, configured to: concatenate audio features extracted from data segments to form an audio feature sequence of the audio data, and encode the audio feature sequence to obtain an attention parameter sequence of the audio data; and a parameter prediction module 4554, configured to: fuse the attention parameter sequence and the weight value sequence to obtain a fusion parameter of each data segment, and determine a recommendation parameter of each data segment based on each fusion parameter; the parameter prediction module 4554 being further configured to determine a recommended segment in the audio data based on the recommendation parameter of each data segment.

In some aspects, the signal source separation module 4551 is configured to perform feature extraction processing on the audio data to obtain a global feature of the audio data; and perform signal source separation on the audio data by using the global feature as a mask to obtain audio track data respectively corresponding to each signal source type in the audio data, a boundary of the mask being used for representing a boundary between audio data corresponding to different signal source types.

In some aspects, the signal source separation module 4551 is configured to perform feature extraction processing on the audio data to obtain an original feature of the audio data; perform multiple levels of pooling processing on the original feature to obtain multiple local features of the audio data; and concatenate the multiple local features to obtain the global feature of the audio data.

In some aspects, the weight configuration module 4552 is configured to determine at least one time period related to the signal source type in the following manner: using, in a case that a signal source type corresponding to the audio track data is voice, a time period that is in the audio track data and that has short time energy greater than an energy threshold and a zero cross counter less than a zero cross counter threshold as a time period related to the voice; or using, in a case that a signal source type corresponding to the audio track data is a background sound, a time period that is in the audio track data and that meets a screening condition as a time period related to the background sound, the screening condition including any one of the following: loudness corresponding to the time period is greater than a lower loudness limit; and a length of the time period is greater than a lower length limit.

In some aspects, the weight configuration module 4552 is configured to perform the following processing for each data segment when audio track data of two signal source types, that is, voice and a background sound, is obtained through signal source separation: determining, based on a parameter of the voice corresponding to the data segment in a case that the data segment belongs to the time period related to the voice, a weight value corresponding to the data segment, the weight value being positively correlated with the parameter, and the parameter including at least one of the following: speech speed, intonation, and loudness; using a preset value as a weight value corresponding to the data segment in a case that the data segment belongs to the time period related to the background sound, the preset value being less than a weight value of any data segment related to the voice; or using zero as a weight value corresponding to the data segment in a case that the data segment does not belong to any time period related to the signal source type.

In some aspects, the weight configuration module 4552 is configured to perform the following processing for each data segment when audio track data of only one signal source type, that is, the background sound, is obtained through source separation: determining, based on a parameter of the background sound corresponding to the data segment in a case that a time period included in the data segment belongs to the time period related to the background sound, a weight value corresponding to the data segment, the weight value being positively correlated with the parameter, and the parameter including at least one of the following: loudness and tone; or using zero as a weight value corresponding to the data segment in a case that a time period included in the data segment does not belong to any time period related to the signal source type.

In some aspects, the feature extraction module 4553 is configured to perform the following processing for each data segment in the audio data: extracting a time-domain signal feature and a frequency-domain signal feature of the data segment; determining, based on at least one time period that is in a playback time line of each piece of audio track data and that is related to the signal source type, a one-dimensional time-domain weight value corresponding to the time-domain signal feature, and determining a two-dimensional frequency-domain weight value corresponding to the frequency-domain signal feature; performing multiple levels of convolution on a product of the one-dimensional time-domain weight value and the time-domain signal feature to obtain a time-domain audio feature; performing multiple levels of convolution on a product of the two-dimensional frequency-domain weight value and the frequency-domain signal feature to obtain a frequency-domain audio feature; resizing the time-domain audio feature to obtain a two-dimensional time-domain audio feature; and fusing the two-dimensional time-domain audio feature with the frequency-domain audio feature to obtain the audio feature of the data segment.

In some aspects, the feature extraction module 4553 is configured to: perform superposition processing on a superposition feature of the two-dimensional time-domain audio feature and the frequency-domain audio feature, and perform two-dimensional convolution on the superposition feature obtained through superposition processing to obtain a two-dimensional convolution result, to obtain a maximum superposition feature and a mean superposition feature of the two-dimensional convolution result; and perform linear activation on a sum between the maximum superposition feature and the mean superposition feature to obtain the audio feature of the data segment.

In some aspects, the parameter prediction module 4554 is configured to perform the following processing for each audio feature in the audio feature sequence: separately fusing the audio feature and each audio feature of another data segment based on an attention mechanism to obtain each weighted correlation degree corresponding to the audio feature; adding the weighted correlation degrees to obtain an attention parameter corresponding to the audio feature, the another data segment being a data segment in the audio data other than the data segment; and concatenating attention parameters based on a sequence of data segments corresponding to each audio feature to form the attention parameter sequence of the audio data.

In some aspects, the parameter prediction module 4554 is configured to: before separately fusing the audio feature and each audio feature of another data segment based on an attention mechanism to obtain each weighted correlation degree corresponding to the audio feature, perform full connection on an audio feature of each data segment of the audio data to obtain an embedding vector of each audio feature; and perform the following processing for the audio feature and each audio feature of the another data segment: multiplying an embedding vector of the audio feature by an embedding vector of the another data segment to obtain a correlation degree between the audio feature and the audio feature of the another data segment; and multiplying the audio feature by the correlation degree to obtain a weighted correlation degree corresponding to the audio feature.

In some aspects, the parameter prediction module 4554 is configured to perform the following processing for each data segment: obtaining, from the attention parameter sequence, an attention parameter corresponding to the data segment, and multiplying a weight value of the data segment by the attention parameter of the data segment to obtain the fusion parameter of the data segment; and performing normalization processing on the fusion parameter to obtain the recommendation parameter of the data segment.

In some aspects, the parameter prediction module 4554 is configured to determine the recommended segment of the audio data in any one of the following manners: performing descending sorting on each data segment based on the recommendation parameter of each data segment, and using at least one data segment starting from the head in a descending sorting result as the recommended segment of the audio data; and using a data segment whose recommendation parameter is greater than a recommendation parameter threshold as the recommended segment.

In some aspects, the parameter prediction module 4554 is configured to generate a recommendation parameter curve of the audio data based on the recommendation parameter of each data segment; and display the recommendation parameter curve of the audio data on a playback interface in response to a playback trigger operation, a horizontal coordinate of the recommendation parameter curve being playback time of the audio data, and a vertical coordinate of the recommendation parameter curve being the recommendation parameter.

In some aspects, the parameter prediction module 4554 is configured to display a label of the recommended segment on the playback interface, the label being used for representing a time period of the recommended segment; and jump, in response to a selection operation for any label, to a start point of a recommended segment corresponding to the selected label to start playback.

In some aspects, signal source separation is implemented by invoking a pyramid scene parsing network of the audio processing model, audio feature extraction from each data segment is implemented by invoking an audio semantic information extraction module of the audio processing model, and encoding and fusion processing are implemented by invoking an attention module of the audio processing model. The audio processing model is trained in the following manner: concatenating, based on a label value of each actual recommended segment of the audio data, to form an actual recommendation parameter sequence of the audio data; concatenating, based on the recommendation parameter of each data segment of the audio data, to form a predicted recommendation parameter sequence of the audio data; obtaining a cross-entropy loss of the audio processing model based on the actual recommendation parameter sequence and the predicted recommendation parameter sequence; and dividing the cross-entropy loss by a quantity of data segments of the audio data to obtain a mean prediction loss, and performing back propagation processing on the audio processing model based on the mean prediction loss to obtain an updated audio processing model.

An aspect of this disclosure provides a computer program product or a computer program. The computer program product or the computer program includes computer instructions, and the computer instructions are stored in a computer readable storage medium. A processor of an electronic device reads the computer instructions from the computer readable storage medium, and the processor executes the computer instructions, so that the electronic device performs the audio data processing method in the aspects of this disclosure.

An aspect of this disclosure provides a computer readable storage medium that stores executable instructions. When the executable instructions are executed by a processor, the processor performs the audio data processing method provided in the aspects of this disclosure, for example, the audio data processing method shown in FIG. 3A.

In some aspects, the computer readable storage medium may be a memory such as an FRAM, a ROM, a PROM, an EPROM, an EEPROM, a flash memory, a magnetic surface memory, an optical disc, or a CD-ROM; or may be any device that includes one or any concatenation of the foregoing memories.

In some aspects, the executable instructions may be compiled in a form of a program, software, a software module, a script, or code, in any form of a programming language (including a compilation or interpretation language, or a declarative or procedural language), and may be deployed in any form, including being deployed as an independent program or as a module, component, subroutine, or another unit suitable for use in a computing environment.

As an example, the executable instruction may be deployed on one electronic device for execution, or executed on multiple electronic devices located at one location, or executed on multiple electronic devices distributed at multiple locations and interconnected by using a communication network.

In conclusion, in the aspects of this disclosure, an entire video is analyzed from a perspective of an audio side in multiple domains and multiple layers of information, so that a recommended segment (for example, a brilliant data segment, a passionate data segment, a sad data segment, or a funny data segment) in entire audio can be quickly located, and a location of a time period of the recommended segment in the video on a time line can be determined based on the recommended segment of the audio. Therefore, in a case that playback record data of audio data is not relied on, the recommended segment can be accurately identified, and accurate reference information is provided for a user, thereby improving user experience. A video recommendation parameter curve can be provided for a player, so that an audience jumps from a playback progress bar from a current playback location to a location of the recommended segment, thereby improving experience of the audience using the player.

The foregoing descriptions are merely aspects of this disclosure and are not intended to limit the protection scope of this disclosure. Any modification, equivalent replacement, or improvement made within the spirit and principle of this disclosure shall fall within the protection scope of this disclosure.

What is claimed is:

1. A method of media processing, comprising:
extracting, by processing circuitry of a server device, audio track data of at least a signal source type from audio data, the audio data comprising multiple data segments, the audio track data comprising at least a time period that is determined to be related to the signal source type;
allocating weight values respectively to the data segments in the audio data according to the audio track data, wherein when the audio track data comprises a first signal source type of voice, a first weight value for a first data segment in a first time period related to the voice is determined based on a voice parameter of the first data segment, the first weight value is positively correlated with the voice parameter, and the voice parameter comprises at least one of speech speed, intonation, and/or loudness;
concatenating the weight values to form a weight value sequence of the audio data;
extracting audio features respectively from the data segments;
concatenating the audio features of the data segments to form an audio feature sequence of the audio data;
encoding the audio feature sequence to obtain an attention parameter sequence of the audio data;
fusing the attention parameter sequence and the weight value sequence to obtain respective fusion parameters for the data segments;
determining recommendation parameters of the data segments based on the fusion parameters;
determining, by the processing circuitry of the server device, a recommended segment in the audio data based on the recommendation parameters of the data segments; and
transmitting, from the server device to a terminal device that plays media including the audio data, signals indicative of the recommended segment in the audio data.

2. The method according to claim 1, wherein the extracting the audio track data comprises:
extracting a global feature of the audio data from the audio data; and
performing a signal source separation on the audio data by using the global feature as a mask to obtain the audio track data, a boundary in the mask representing a boundary between different signal source types.

3. The method according to claim 2, wherein the extracting the global feature of the audio data from the audio data comprises:
performing a feature extraction on the audio data to obtain an original feature of the audio data;
performing multiple levels of pooling processing on the original feature to obtain multiple local features of the audio data; and
concatenating the multiple local features to obtain the global feature of the audio data.

4. The method according to claim 1, wherein the extracting the audio track data further comprises:
determining that the first time period is related to the voice when short time energy in the first time period is greater than an energy threshold and a zero cross counter in the first time period is less than a zero cross counter threshold.

5. The method according to claim 1, wherein the extracting the audio track data further comprises:
determining, when the audio track data comprises a second signal source type of a background sound, that a second time period is related to the background sound when the audio data in the second time period satisfies at least one of:
loudness of the second time period is greater than a lower loudness limit; and/or
a length of the second time period is greater than a lower length limit.

6. The method according to claim 1, further comprising at least one of:
allocating a preset value as a second weight value to a second data segment in a second time period related to a second signal source type of background sound, the preset value being less than the first weight value of the first data segment related to the voice; and/or
allocating zero as a third weight value to a third data segment when the third data segment does not belong to a time period related to the first signal source type or related to the second signal source type.

7. The method according to claim 1, wherein the audio track data comprises a single signal source type of background sound, and the allocating the weight values to the data segments comprises:
determining, based on a background sound parameter of a data segment in a first time period related to the background sound, a weight value corresponding to the data segment, the weight value being positively correlated with the background sound parameter, and the background sound parameter comprising at least one of loudness and/or tone; or
allocating zero as the weight value to the data segment when the data segment does not belong to a time period related to the single signal source type of the background sound.

8. The method according to claim 1, wherein further comprising:

for each data segment in the data segments, extracting a time-domain signal feature and a frequency-domain signal feature of the respective data segment;

determining, based on a first time period related to the signal source type, a one-dimensional time-domain weight value corresponding to the time-domain signal feature; and determining, based on the first time period related to the signal source type, a two-dimensional frequency-domain weight value corresponding to the frequency-domain signal feature;

performing multiple levels of convolution on a product of one-dimensional time-domain weight values of the data segments and time-domain signal features of the data segments to obtain time-domain audio features;

performing multiple levels of convolution on a product of two-dimensional frequency-domain weight values of the data segments and frequency-domain signal features of the data segments to obtain frequency-domain audio features;

resizing the time-domain audio features to obtain two-dimensional time-domain audio features; and fusing the two-dimensional time-domain audio features with the frequency-domain audio features to obtain the audio features of the data segments.

9. The method according to claim 8, wherein the fusing the two-dimensional time-domain audio features with the frequency-domain audio features to obtain the audio features of the data segments comprises:

determining a superposition feature of a two-dimensional time-domain audio feature and a frequency-domain audio feature for a data segment of the data segments;

performing two-dimensional convolution on the superposition feature to obtain a two-dimensional convolution result;

obtaining a maximum superposition feature and a mean superposition feature of the two-dimensional convolution result; and performing linear activation on a sum of the maximum superposition feature and the mean superposition feature to obtain an audio feature of the data segment.

10. The method according to claim 1, wherein the encoding the audio feature sequence to obtain the attention parameter sequence of the audio data comprises:

for a first audio feature in the audio feature sequence that is an audio feature of a first data segment in the data segments:

respectively fusing the first audio feature and each audio feature of other data segments in the data segments based on an attention mechanism to obtain weighted correlation degrees corresponding to the first audio feature; and adding the weighted correlation degrees to obtain an attention parameter corresponding to the first audio feature; and concatenating attention parameters corresponding to the audio features based on a sequence of the data segments to form the attention parameter sequence of the audio data.

11. The method according to claim 10, further comprising:

performing full connection on an audio feature of each data segment of the audio data to obtain an embedding vector of each audio feature.

12. The method according to claim 10, wherein:

the respectively fusing the first audio feature and each audio feature of the other data segments comprises:

multiplying a first embedding vector of the first audio feature of the first data segment by a second embedding vector of a second audio feature of another data segment to obtain a correlation degree between the first audio feature and the second audio feature of the other data segment; and multiplying the first audio feature by the correlation degree to obtain a weighted correlation degree corresponding to the first audio feature.

13. The method according to claim 1, wherein the fusing the attention parameter sequence and the weight value sequence to obtain the fusion parameters respectively for the data segments further comprises:

obtaining, from the attention parameter sequence, an attention parameter corresponding to a data segment; and multiplying a weight value of the data segment by the attention parameter of the data segment to obtain a fusion parameter of the data segment; and the determining the recommendation parameters of the data segments based on the fusion parameters comprises:

performing normalization processing on a fusion parameter of a data segment to obtain a recommendation parameter of the data segment.

14. The method according to claim 1, wherein the determining the recommended segment in the audio data based on the recommendation parameters of the data segment comprises:

sorting the data segments in a descending order based on the recommendation parameters of the data segments; and determining at least one data segment from a head portion of the sorted data segments as the recommended segment of the audio data.

15. The method according to claim 1, wherein the determining the recommended segment in the audio data based on the recommendation parameters of the data segments comprises:

determining a data segment whose recommendation parameter is greater than a recommendation parameter threshold as the recommended segment.

16. The method according to claim 1, further comprising:

generating a recommendation parameter curve of the audio data based on the recommendation parameters of the data segments; and displaying the recommendation parameter curve of the audio data on a playback interface in response to a playback trigger operation, the recommendation parameter curve representing a relationship of the recommendation parameters to a playback time of the audio data.

17. The method according to claim 16, further comprising:

displaying a label of the recommended segment on the playback interface, the label representing a time period of the recommended segment; and jumping, in response to a selection operation for the label, to a start point of the recommended segment corresponding to the label to start playback.

18. The method according to claim 1, further comprising:

training an audio processing model based on sample audio data to obtain a trained audio processing model; and performing the media processing based on the trained audio processing model, wherein the training the audio processing model comprises:

concatenating, based on label values of actual recommended segments of the sample audio data, to form an actual recommendation parameter sequence of the sample audio data;

concatenating, based on predicted recommendation parameters of data segments of the sample audio data according to the audio processing model, to form a predicted recommendation parameter sequence of the sample audio data;

obtaining a cross-entropy loss of the audio processing model based on the actual recommendation parameter sequence and the predicted recommendation parameter sequence;

dividing the cross-entropy loss by a quantity of the data segments of the sample audio data to obtain a mean prediction loss; and performing back propagation processing on the audio processing model based on the mean prediction loss to obtain an updated audio processing model.

19. An apparatus for media processing, comprising processing circuitry configured to:

extract audio track data of at least a signal source type from audio data, the audio data comprising multiple data segments, the audio track data comprising at least a time period that is determined to be related to the signal source type;

allocate weight values respectively to the data segments in the audio data according to the audio track data, wherein when the audio track data comprises a first signal source type of voice, a first weight value for a first data segment in a first time period related to the voice is determined based on a voice parameter of the first data segment, the first weight value is positively correlated with the voice parameter, and the voice parameter comprises at least one of speech speed, intonation, and/or loudness;

concatenate the weight values to form a weight value sequence of the audio data;

extract audio features respectively from the data segments;

concatenate the audio features of the data segments to form an audio feature sequence of the audio data;

encode the audio feature sequence to obtain an attention parameter sequence of the audio data;

fuse the attention parameter sequence and the weight value sequence to obtain respective fusion parameters for the data segments;

determine recommendation parameters of the data segments based on the fusion parameters; and determine a recommended segment in the audio data based on the recommendation parameters of the data segments.

\* \* \* \* \*